(12) United States Patent
Abe

(10) Patent No.: US 7,075,625 B2
(45) Date of Patent: Jul. 11, 2006

(54) RANGE FINDER AND METHOD

(75) Inventor: Tsutomu Abe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 224 days.

(21) Appl. No.: 10/702,597

(22) Filed: Nov. 7, 2003

(65) Prior Publication Data

US 2004/0246495 A1 Dec. 9, 2004

Related U.S. Application Data

(63) Continuation-in-part of application No. 10/373,761, filed on Feb. 27, 2003, now abandoned.

(30) Foreign Application Priority Data

Aug. 28, 2002 (JP) .............................. 2002-248034
Aug. 25, 2003 (JP) .............................. 2003-299505

(51) Int. Cl.
*G01C 3/14* (2006.01)
*G01C 3/00* (2006.01)

(52) U.S. Cl. .................. 356/3.01; 356/3.02; 356/3.03; 356/3.04; 356/3.05; 356/3.1

(58) Field of Classification Search ............... 356/3.01
See application file for complete search history.

(56) References Cited

U.S. PATENT DOCUMENTS 4,842,411 A 6/1989 Wood 5,548,392 A * 8/1996 Ogawa .................... 356/3.13
6,356,298 B1 3/2002 Abe et al.
6,417,880 B1 7/2002 Uomori et al.
6,549,288 B1 4/2003 Migdal et al.
6,549,289 B1 4/2003 Ellis

FOREIGN PATENT DOCUMENTS

| JP | A 3-192474 | 8/1991 |
| JP | A 5-332737 | 12/1993 |
| JP | A 2000-9442 | 1/2000 |
| JP | 2000-065542 | * 3/2000 |
| JP | A 2000-65542 | 3/2000 |

* cited by examiner

*Primary Examiner*—Thomas H. Taroza
*Assistant Examiner*—Luke Ratcliffe
(74) *Attorney, Agent, or Firm*—Oliff & Berridge, PLC

(57) ABSTRACT

Pattern projection apparatuses are placed on each other in a stack manner in a stripe pattern direction for projecting the same patterns. An image pickup apparatus (camera 1) is placed between the pattern projection apparatuses. The optical axes of the pattern projection apparatuses and the image pickup apparatus are aligned on the same plane parallel with the stripe pattern direction. On the plane, the principal points also become the same. An image of a stripe pattern is picked up directly by the image pickup apparatus without the intervention of a half mirror, etc., and is recoded. An image of the recoded stripe pattern is picked up by an image pickup apparatus (camera 2) and is decoded and the range of an object is measured by triangulation based on image correspondence points.

15 Claims, 32 Drawing Sheets

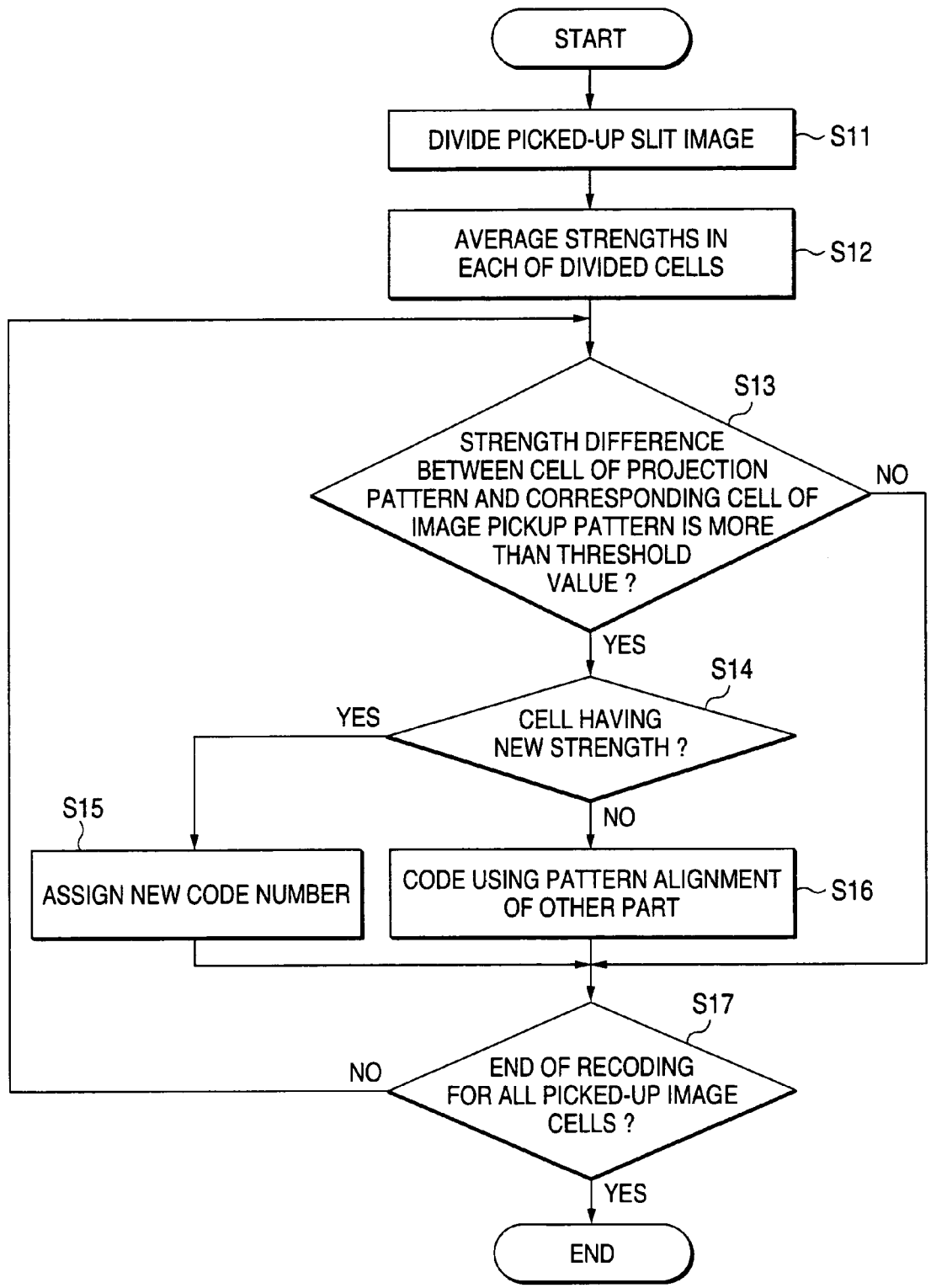

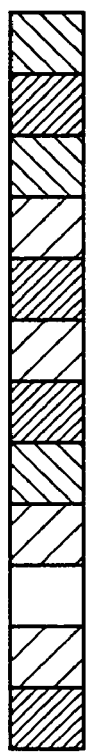
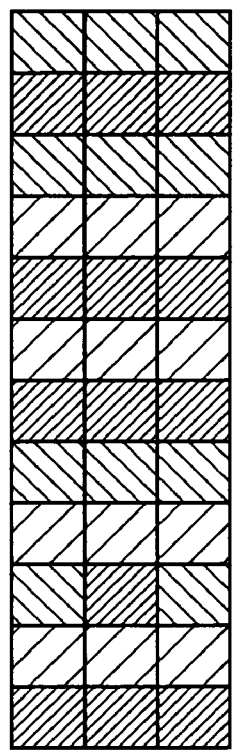
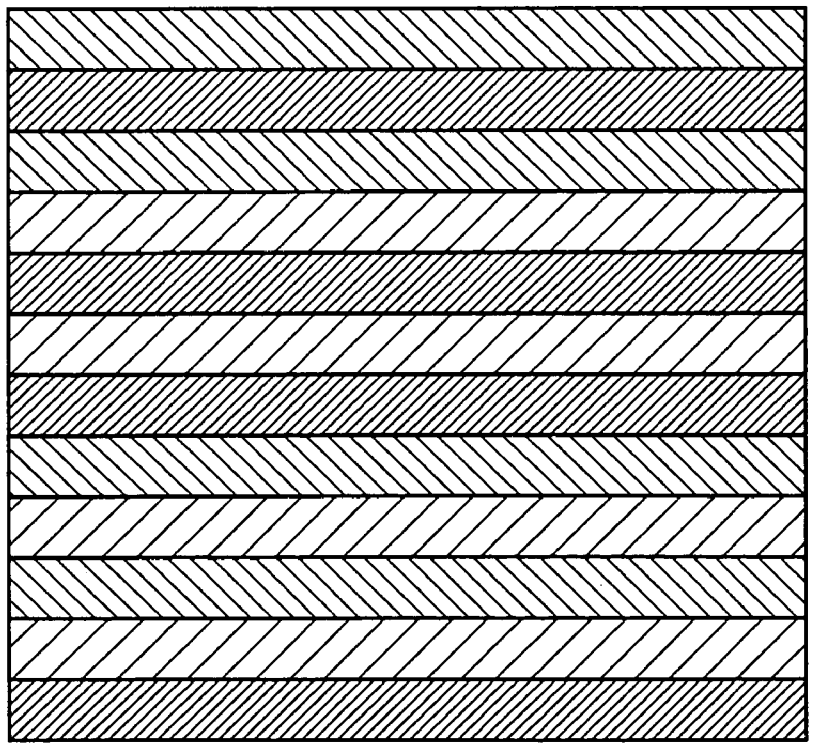
FIG. 24A
FIG. 24B
FIG. 24C

RANGE FINDER AND METHOD

This is a continuation-in-part application of application Ser. No. 10/373,761 filed Feb. 27, 2003.

The present disclosure relates to the subject matter contained in Japanese Patent Application No. 2002-248034 filed on Aug. 28, 2002 and Japanese Patent Application No. 2003-299505 filed on Aug. 25, 2003, which are incorporated herein by reference in its entirety.

BACKGROUND OF THE INVENTION

1. Field of the Invention

The invention relates to a three-dimensional image pickup art based on a triangulation technique for picking up a pattern projection image provided by applying pattern light to a measurement object from different directions by one or a plurality of image pickup device and obtaining a range data based on pattern change.

2. Description of the Related Art

As a technique of acquiring a three-dimensional shape, active vision and passive vision are available. The active vision includes (1) a technique of emitting laser light or a ultrasonic wave, measuring reflected light amount from an object or arrival time at the object, and extracting depth information, (2) a pattern projection method of using a special pattern light source such as stripe light to estimate an object shape from image information such as geometric change of an object surface pattern, (3) a method of forming contour lines based on moire fringes by optical processing and obtaining three-dimensional information. On the other hand, the passive vision includes monocular stereoscopic viewing for estimating three-dimensional information from one image using knowledge concerning object viewing, light source, lighting, shadow information and the like, and twin-lens stereoscopic viewing for estimating depth information of each pixel based on the triangulation principle.

Generally, the active vision has higher measurement accuracy than the passive vision, but often has a small measurement range because of limit of a light projection device and the like. On the other hand, the passive vision is a general-purpose technique and has less restriction on an object. The invention relates to the pattern projection method of a range finder of the active vision.

In the pattern projection method, reference pattern light is projected onto an object and an image is picked up from a different direction from a projection direction of the reference pattern light. The picked-up pattern image is deformed by the shape of the object. The observed deformation pattern and the projection pattern are related to each other, whereby range finding on the object can be conducted. The pattern projection method involves a problem of how to lessen erroneous correspondence in relating the deformation pattern and the projection pattern to each other and easily relate the deformation pattern and the projection pattern to each other. Then, various pattern projection techniques (space coding method, moire, color coding) have been proposed.

As a typical example of the space coding, a proposition disclosed in JP-A-5-3327375 will be discussed. An apparatus in the example has a laser light source, a lens system, a scanner, a camera, and a controller. The lens system shapes laser light into a slit form. The scanner applies and scans the shaped laser light to and over an object. The camera detects reflected light from the object. The controller controls the components.

Laser light application portions and laser light non-application portions form stripes on the object by the laser light scanned from the scanner. As the laser light is applied according to different patterns, the object is divided into N identifiable portions. It is determined which division portion each pixel of the image of the object picked up by the camera from different positions is contained in, whereby the shape of the object can be calculated.

In the example, to raise the resolution, it becomes necessary to perform laser scanning two or more times and pick up an image by the camera two or more times. For example, when a full screen is divided into 256 regions (256 resolution levels), it becomes necessary to pick up an image eight times. Thus, it becomes difficult to pick up an image of an object moving fast and further the image pickup system needs to be reliably fixed during scanning. Therefore, even if the apparatus itself becomes simple, it is difficult to easily pick up an image.

As a technique for decreasing number of pattern light projection times, a color coding method disclosed in JP-A-3-192474 is available. In the color coding, letting q and k be predetermined natural numbers of two or more, a coded pattern is controlled so that using q or more colors, two adjacent stripe light beams do not become the same color and color alignment produced by k adjacent stripe light beams appears only once. Stripe colors are detected from the observed image. Stripe numbers are acquired from the color alignment of the corresponding stripes. The stripe application directions can be calculated from the stripe numbers and the range data can be calculated as with the example of the space coding.

However, in the color coding, codes are restored from the coding pattern list and thus there is a problem of large calculation amount of restoring the codes. Further, in a case of dividing an area into 256 regions using three colors of R, G, and B, it is necessary to know alignment of eight stripe light beams surrounding the stripe whose code is to be known. Therefore, the color coding suits only for measurement of a shape in which stripes can be continuously long observed.

As a technique for easily restoring stripes and further projecting a coded pattern once, a space coding method disclosed in Japanese Patent No. 2565885 is available. In Japanese Patent No. 2565885, there are provided three or more kinds of gradation areas using light and shade of a ternary value or more, or three or more colors, or a combination of light and shade with color. Also provided is a multi-valued lattice plate pattern disposed so that at least three kinds of gradation areas contact one another at an intersection point of boundary lines of the gradation areas. Main codes, which conform to the kind and order of gradations, are generated at an intersection point of projected images resulting from projection of pattern to an object to be measured, to touch the intersection point. A combined code obtained by combining the main codes with each other is used as a featurecode for identification of the previous intersection point.

However, in the above described system, coding is broken depending on the object to be measured and it may be made impossible to correctly relate codes to each other. Projected pattern row may be recognized with missing pattern row photographed by a camera or an inverted pattern row may be obtained depending on the structure of the photographed object. It becomes difficult to relate because of change in the projected pattern and photographed pattern row depending on the shape of the object, the reflection factor of the object, etc.

In the color coding, this problem is circumvented by using a technique in which decoding is not performed for a pattern having a possibility of loss or inversion of stripe when stripes are grouped at the decoding time. In the space coding method, a two-dimensional pattern is used to decrease the possibility of the error described above, but the same error will occur depending on the object on principle. Therefore, the above-described system can provide excellent accuracy in photographing (image pickup) in special circumstances in a laboratory or in circumstances where the objects are limited, but the accuracy is degraded in general photographing (image pickup) circumstances where the objects are not limited.

The applicant proposed a range finder, which does not depend on the object by feeding back a projected pattern and generating new code (JP-A-2000-9442, JP-A-2000-65542, and U.S. Pat. No. 6,356,298 corresponding to JP-A-2000-65542). The proposition will be discussed below:

FIG. 20 shows the general configuration of a range finder disclosed in JP-A-2000-65542. FIG. 21 shows a positional relationship between a light source and image pickup devices of the range finder.

In the configuration shown in FIG. 21, a range finder includes three cameras 101 to 103 and a projector 104. Distances 11, 12, and 13 in the figure are made equal so that the distance relationship among the cameras matches. The first camera 101 and the projector 104 are placed so that optical axes match using a half mirror 105 as a beam splitter. The second camera 102 and the third camera 103 are placed on both sides of the first camera 101 and the projector 104 so that the second camera 102 and the third camera 103 differ from the first camera 101 and the projector 104 in optical axis. A distance between the optical axis at the center and that on either side is base line length L.

The projector 104 has a light source 106, a mask pattern 107, a strength pattern 108, and a prism 109. An invisible-region light source using infrared or ultraviolet light can be used as the light source 106. In this case, each camera is configured as shown in FIG. 22. That is, incident light 310 is split in two directions through a prism 301. One is incident on an image pickup apparatus (for example, a CCD camera) 303 through an invisible-region (infrared or ultraviolet) transmission filter 302. The other is incident on an image pickup apparatus 305 through an invisible-region (infrared and ultraviolet) cut-off filter 304.

A light source having a wavelength range capable of picking up an image regardless of a visible region or an invisible region may be used as the light source 106 shown in FIG. 16. In this case, a CCD camera of progressive scan type is used as the first camera 101 and the second camera 102 and the third camera 103 may be of any configuration. However, considering compatibility with the first camera 101, CCD cameras of the same configuration as the first camera 101 are desirable. A pattern is projected from the light source 106 and the three cameras (101 to 103) pick up an image at the same time. Each camera acquires an image in batch by obtaining the light passing through the filter 302, 304 (see FIG. 17) in the image pickup apparatus 303, 305.

The configuration of the range finder will be discussed with reference to FIG. 20. As shown in the figure, the second camera 102 stores brightness information provided by picking up an image in brightness value memory 121 and stores an image pickup pattern in pattern image memory 122. Likewise, the third camera 103 stores brightness information in brightness value memory 123 and stores an image pickup pattern in pattern image memory 124. The first camera 101 stores brightness information in brightness value memory 125 and stores an image pickup pattern in pattern image memory 126. To reference a coded pattern, which is prepared in advance, later, the projector 104 divides each slit into cells on a square lattice for storage in frame memory 127.

Using the stored image pickup patterns and brightness information, a three-dimensional image is obtained as follows: The following operation is common to both a combination of the second camera 102 and the first camera 101 and a combination of the third camera 103 and the first camera 101 and therefore will be discussed by taking the combination of the second camera 102 and the first camera 101 as an example.

In FIG. 20, an area division section 128 performs area division of an image pickup pattern picked up by the first camera 101. The area division section 128 extracts an area with the strength difference between adjacent slit patterns being a threshold value or less as an area 1 where light from the projector does not reach, and extracts an area with the strength difference between adjacent slit patterns being the threshold value or more as an area 2. A recoding section 129 recodes the extracted area 2 using the image pickup pattern stored in the pattern image memory 126 and the projection pattern stored in the frame memory 127.

FIG. 23 is a flowchart for recoding. First, each slit pattern is divided in a longitudinal direction for each slit width (step S11) to generate square cells. The strengths of the generated cells are averaged and the average value is adopted as the strength of each cell (step S12). A comparison is made between each of cells of the projection pattern and each of corresponding cells of the image pickup pattern with respect to the strength in order starting at the center of the image. Then whether or not the strength difference between the cells is more than a threshold value because of change in pattern caused by the reflection factor of the object, the range data to the object, and the like is determined (step S13). If the strength difference between cells is not more than the threshold value, the recoding is terminated for all picked-up image cells (step S17).

If the strength difference between the cells is more than the threshold value, whether or not the cell of the image pickup pattern is a cell having new strength is determined (step S14). If the cell of the image pickup pattern is a cell having new strength, new code is generated and assigned (step S15). If the cell of the image pickup pattern is not a cell having new strength, coding is performed using a slit pattern alignment of other part (step S16). The recoding is now complete (step S17).

FIGS. 24A to 24C show a coding example of a slit pattern; FIG. 24A shows a projection pattern coded based on a slit alignment, and 3 (strong), 2 (medium), and 1 (weak) are assigned as the strength. In FIG. 24B, the strength is changed in the third cell from the left and a new code appears. Thus, new code of 0 is assigned. In FIG. 24C, an existing code appears in the third cell from the left, the second cell from the top. Thus, recoding is performed in such a manner that the vertical alignment is [232] and the horizontal alignment is [131] as new code from the cell alignment. This recoding is equal to light projection of a complicated pattern such as a two-dimensional pattern to a part of the object shape rich in change and light projection of a simple pattern to a part less in change. This process is repeated for assigning unique codes to all cells, thereby performing recoding.

FIG. 25 shows an example of projecting a coded pattern onto a plate 606 placed in front of a wall 605 using cameras 601 to 603 and a projector 604. The coded pattern is a slit pattern shown in FIG. 26. At this time, areas 801 and 901 as shadows of the plate 606 occur in images provided by the cameras 601 and 602, as shown in FIGS. 27 and 28. In the example, on the surface of the plate 606, a slit pattern as shown in FIG. 29 is provided as a new coded pattern.

Referring again to FIG. 20, a decoding section 130 of the second camera 102 extracts the image on which the projection pattern is pick up from the pattern image memory 122 and divides the image pickup pattern into cells in a similar manner to that described above. Using the codes provided by the recoding section 129, a decoding section 130 detects the code of each cell and calculates slit angle θ from the light source based on the detected codes. FIG. 30 is a drawing to show a range calculation method in the space coding. Range Z is calculated according to the following expression (1) from the slit angle θ of the cell to which each pixel belongs, the x coordinate on the image picked up by the second camera 102, focal distance F of a camera parameter, and base line length L:

$$Z=(F\times L)/(x+F\times \tan \theta) \quad (1)$$

The range Z is also calculated in a similar manner in a decoding section 131 of the third camera 103.

For the area 1 described above, the rage is calculated as follows: In the area 1, pattern detection based on the projected pattern cannot be executed and thus a correspondence point search section 132 detects a parallax using the brightness information read from the brightness value memories 121, 123, and 125 of the cameras 101 to 103, and calculates the range based on the detected parallax. For areas except the area 1, the range is calculated by performing the above-described operation and thus the minimum value of the range of the area 1 is obtained and the pixels, which can be related, are also limited. Using the limitation, the pixels are related to each other and parallax d is detected and using pixel size λ of a camera parameter, the range Z is calculated according to the following expression (2):

$$Z=(L\times F)/(\lambda \times d) \quad (2)$$

With the range information provided by using the first camera 101 and the third camera 103 in combination according to the technique described above, range information of the area 801 as the shadow of the plate shown in FIG. 27 cannot be detected. On the other hand, with the range information provided by using the first camera 101 and the second camera 102 in combination, range information of the area 901 as the shadow of the plate shown in FIG. 28 cannot be detected. That is, the shadow areas are areas blocked by the plate that light does not reach, and cannot be measured according to the system. Therefore, range information is found for areas other than the shadow areas. That is, a range information integration section 133 in FIG. 20 acquires range information for all pixels of the image of the first camera 101 (FIG. 31), namely, pixels other than the shadows from the range information calculated in the pair of the first camera 101 and the second camera 102 and the range information calculated in the pair of the first camera 101 and the third camera 103. The range information provided by performing the described operation is related to brightness image of the first camera 101, for example, for storage in three-dimensional memory, whereby three-dimensional image pickup is performed.

The description of the contents of the related art (JP-A-2000-65542) is now complete.

The range finder described in JP-A-2000-9442, JP-A-2000-65542 projects a projection pattern coded according to a plurality of strengths and a plurality of wavelengths. At this time, the projection pattern is changed by the effects of brightness information, material, and the like of the subject and when a three-dimensional shape is calculated, an error occurs and an appropriate three-dimensional shape cannot be measured. Thus, the range finder includes the monitor image pickup device placed at the same principal point as the projection element, monitors change in a projection pattern based on measured object information, performs recoding, and measures a three-dimensional shape.

In the configuration, however, making the same the principal points of the projection element and the image pickup device is indispensable for recoding; to do this, abeam splitter such as a half mirror is used to match the principal points of the projection element and the image pickup device.

If a half mirror or the like is used to match the principal points, the light projected from the projection element is attenuated through the halfmirror. The pattern projected onto the measured object is attenuated in brightness through the half mirror and is input to the image pickup device. It is assumed that ideally the half mirror can distribute at 50:50 at an angle of 45 degrees. The measured object is observed with an attenuation of 25% as compared with a case where light from the projection element is projected directly on the measured object and the measured object is observed on the image pickup device. In the range finder in the related art, as shown in FIG. 21, the half mirror intervenes between the image pickup device intended for recoding and the image pickup device for shape measurement. Because of the effect of the half mirror, double brightness difference occurs on principle between the measured object observed on the image pickup device for shape measurement and the measured object observed on the image pickup device intended for recoding.

Further, in the pattern projected from the projection element, pattern unevenness is also caused due to optical passage difference before and after being split, film thickness unevenness of the application material of the half mirror and the like. A light scattering produced by dirt, dust, or the like on the half mirror also occurs in coaxial image.

Thus, if information with the projection pattern changed by subject information is recoded in the monitor image pickup device, the image is not provided strictly under the same condition as the image observed on the image pickup device for shape calculation and therefore precision degradation of shape measurement is caused.

Further, as for the dynamic range of image pickup device, if image pickup devices of the same characteristics are used, it is difficult to drive the monitor and measurement image pickup devices under the same condition, and degradation of precision of measurement caused by recoding occurs.

SUMMARY OF THE INVENTION

According to the invention, to solve the problems, a combination of a projector for projecting a coded pattern and an image pickup device for monitoring is formed without using a beam splitter or a halt mirror.

The combination of the projector and the image pickup device is called projection system. As the coded pattern, a stripe pattern ideally orthogonal to an epipola line of the projection system and an image pickup device for shape measurement is projected. The range finder in JP-A-2000-9442, JP-A-2000-65542 performs recoding by matching the principal points of the projector and the image pickup device of the projection system with each other. To perform recoding, optical match in the direction orthogonal to stripes is required. That is, the principal points of the projector and the image pickup device of the projection system need to match in the direction orthogonal to the stripes.

In the invention, attention is focused on this point and preferably two or more projectors are placed on each other in the same direction as the stripes of the stripe pattern projected by the projection element so as to project the same pattern. At this time, the projectors are placed so that the stripe images shift depending on the subject. The principal point positions in the direction orthogonal to the stripe direction are matched between the projectors and the image pickup device for recoding is placed therebetween. According to the configuration of the projection system described above, it is made possible to match the principal points of the image pickup device for recoding and the projector without the need for the intervention of an optical device such as a half mirror or a beam splitter, so that a range finder free of the effect of image degradation, etc., affected by placing a half mirror or a beam splitter can be provided.

In order to match edges of images of the stripe patterns, which are projected from the plurality of projectors, each of optical systems of the stacked projectors is lens-shifted to superpose the projected stripe patterns at a predetermined object distance.

Since the principal points of the projector and the image pickup device of the projection system need only to match in the direction orthogonal to the stripe direction, the number of projectors may be reduced to only one.

In a case of installing one projector, the optical system of the projector and/or that of the first camera are lens-shifted so that the projected stripe image at a predetermined object distance and picked-up field angle are matched.

Alternatively, a projection lens of the projector and a pickup lens of the first camera are arranged to be very close to each other to have the approximately same axis.

To the end, according to one aspect of the invention, there is provided a range finder including a projector for projecting a coded stripe pattern, a first camera for picking up an image of the stripe pattern projected by the projector, the first camera placed so that a principal point of the first camera and a principal point of the projector are placed along a length direction of the stripe pattern; and a second camera for picking up an image of the stripe pattern projected by the projector, the second camera placed so that a principal point of the second camera and the principal point of the first camera are placed away from each other in a direction not parallel to the length direction of the stripe pattern. An area with change amount of the stripe pattern, which is picked up by the first camera, with respect to the stripe pattern projected by the projector being a predetermined value or more is determined. A new code is assigned to the area. The second camera picks up a recoded stripe pattern projected by the projector after the new code is assigned. Range information of a three-dimensional object onto which the stripe pattern is projected is generated based on the recoded stripe pattern picked up by the second camera.

Preferably, the principal point of the second camera and the principal point of the first camera are placed on the same line along the direction perpendicular to the length direction of the stripe pattern. However, the principal points of the first and second camera may be placed on the same line forming a predetermined angle other than the right angles with the length direction of the stripe pattern.

In the configuration, it is not necessary to place a half mirror or a beam splitter between the projector and the image pickup device (first camera) of the projection system as described above, so that image degradation can be circumvented. It should be noted that the range image may be calculated from the images picked up by the first and second cameras by means of the triangulation instead of recoding the stripe pattern.

BRIEF DESCRIPTION OF THE DRAWINGS

In the accompanying drawings:

FIG. 23 is a flowchart to show a processing flow of the range finder in the related art in FIG. 20;

FIGS. 24A to 24C are drawings to show a coding example of a projection pattern of the range finder in the related art in FIG. 20;

DETAILED DESCRIPTION OF THE PREFERRED EMBODIMENTS

Referring now to the accompanying drawings, there is shown a preferred embodiment of the invention.

Figure 1:
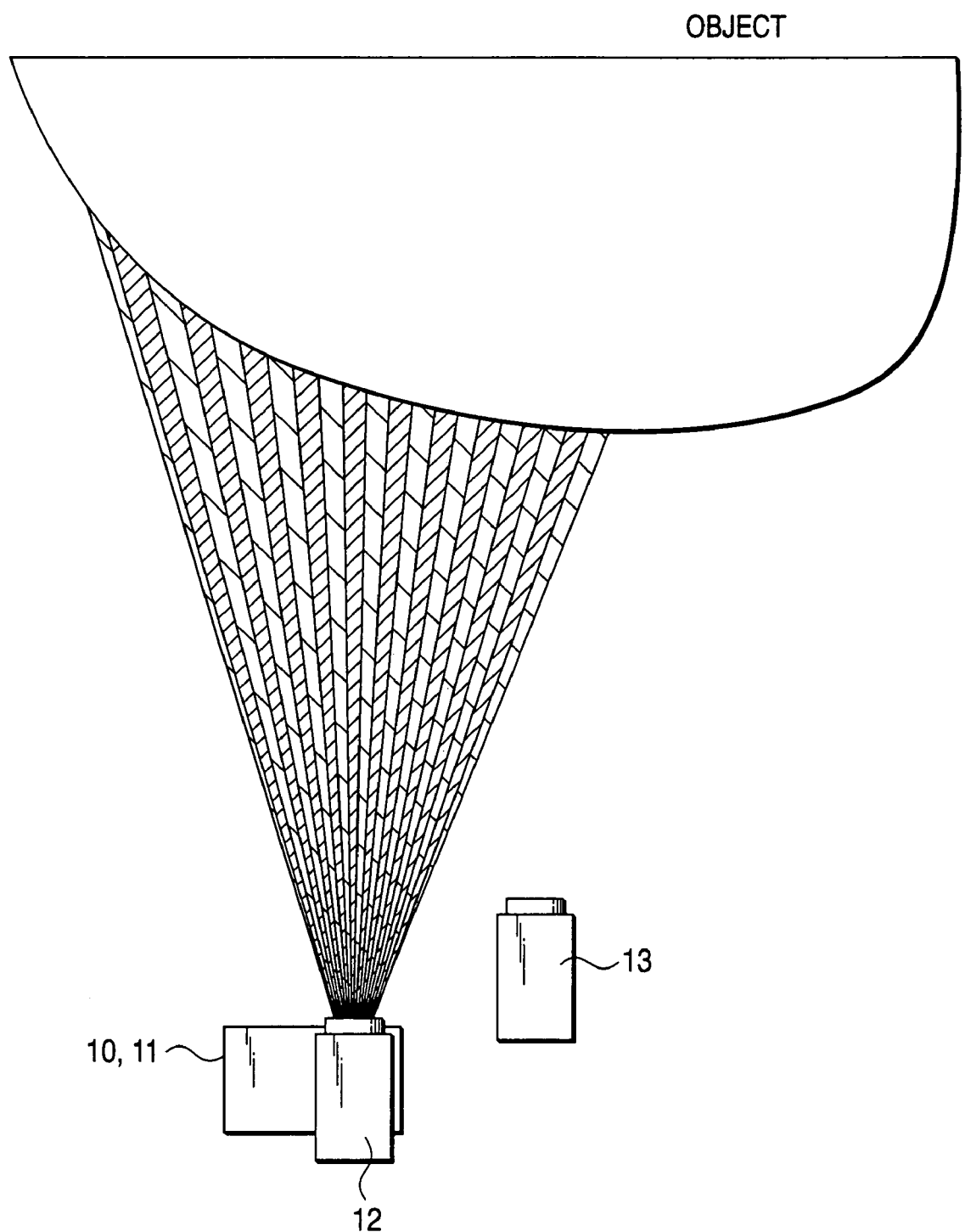
FIG. 1 is a plan view to show a range finder of an embodiment of the invention.
Figure 2:
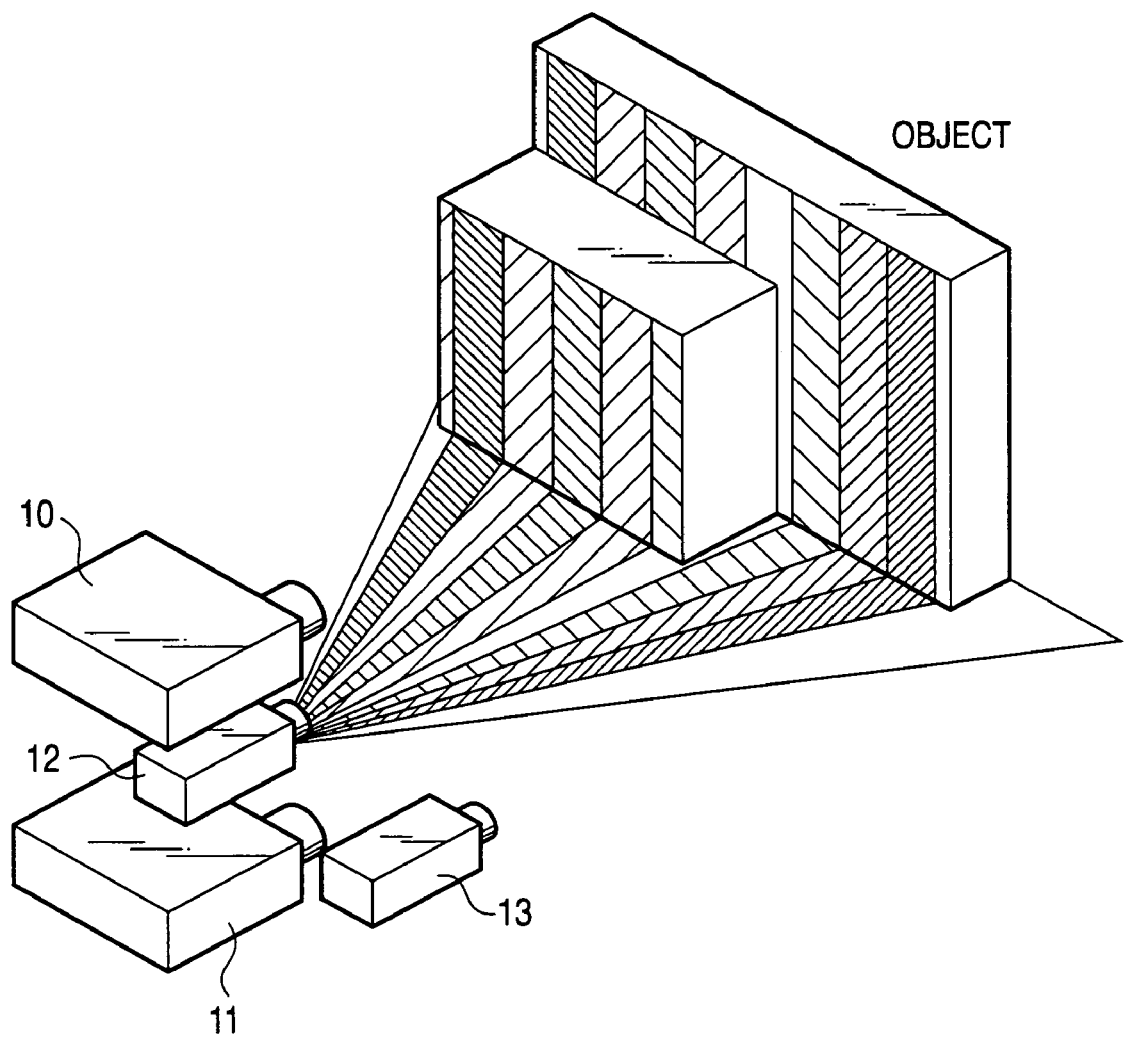
FIG. 2 is a perspective view to show the range finder of the embodiment of the invention.

FIG. 1 is a top view of a range finder according to an embodiment of the invention. FIG. 2 is a drawing of viewing the range finder from the slanting top thereof. In the embodiment, two pattern projection apparatus (also called projectors) are used. As the pattern projection apparatus, for example, commercially available projectors for projecting an image onto a screen can be used.

In the embodiment, generation of a coded stripe pattern, monitor of a coded stripe pattern, re-coding based on the monitor, and triangulation are similar to those in the related arts previously described with reference to FIGS. 15 to 26 and therefore will not be discussed again.

In FIGS. 1 and 2, the range finder includes two pattern projection apparatus (projectors) 10 and 11, an image pickup apparatus (camera 1) 12, and an image pickup apparatus (camera 2) 13 for triangulation. The image pickup apparatus 12 monitors a pattern on the same optical axis as the projectors 10 and 11. The term "same optical axis" mentioned here means that optical axes of the pattern projection apparatus 10 and 11 and the image pickup apparatus 12 for monitoring are arranged in the same plane along pattern stripes.

Basically, as with the related art example, the stripe patterns projected by the pattern projection apparatus 10 and 11 are observed from the image pickup apparatus (camera 1) 12 at the same principal point, recoding is performed, and a range image is calculated using the image observed on the image pickup apparatus (camera 2) 13 for measurement. As the recoding is performed, error-free, highly accurate measurement is made possible. As the projection apparatus, projectors or laser stripe projection systems are used. It goes without saying that the projection apparatus is not limited to these examples.

Figure 3:
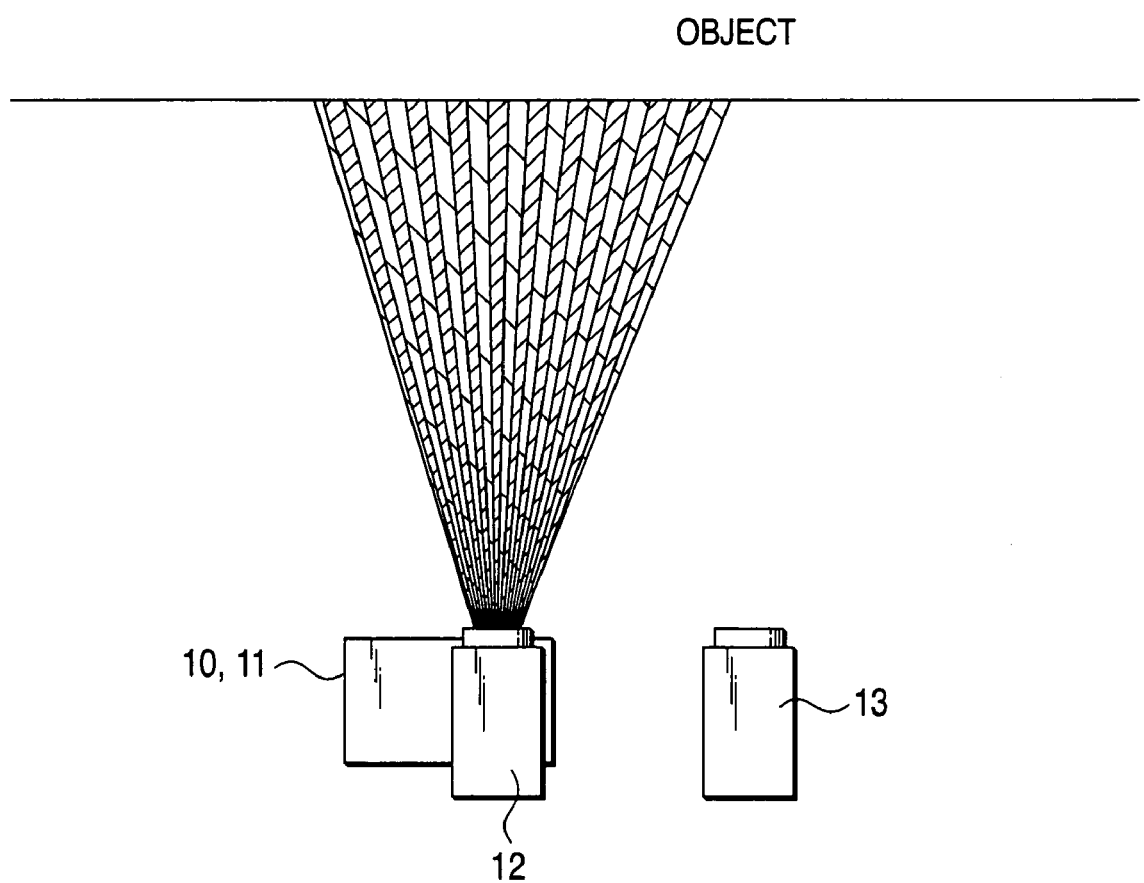
FIG. 3 is a drawing to describe the relationship between the principal point of pattern projection apparatus and the principal point of an image pickup apparatus for monitoring in the range finder of the embodiment of the invention.

In the embodiment, as shown clearly in FIG. 2, two pattern projection apparatus 10 and 11 are placed on each other in a stripe pattern direction for projecting the same pattern, and the image pickup apparatus (camera 1) 12 is placed between the pattern projection apparatus 10 and 11. Consequently, as shown in FIG. 3, the principal points of the lenses in a spread direction of the stripe image are matched and recoding is performed. The image pickup apparatus (camera 2) 13 is place so that a principal point of the image pickup apparatus (camera 2) 13 and a principal point of the image pickup apparatus (camera 1) 12 are placed away from each other in a direction not being parallel to a stripe pattern direction (in this case, in a direction substantially perpendicular to the stripe pattern direction).

Figure 4:
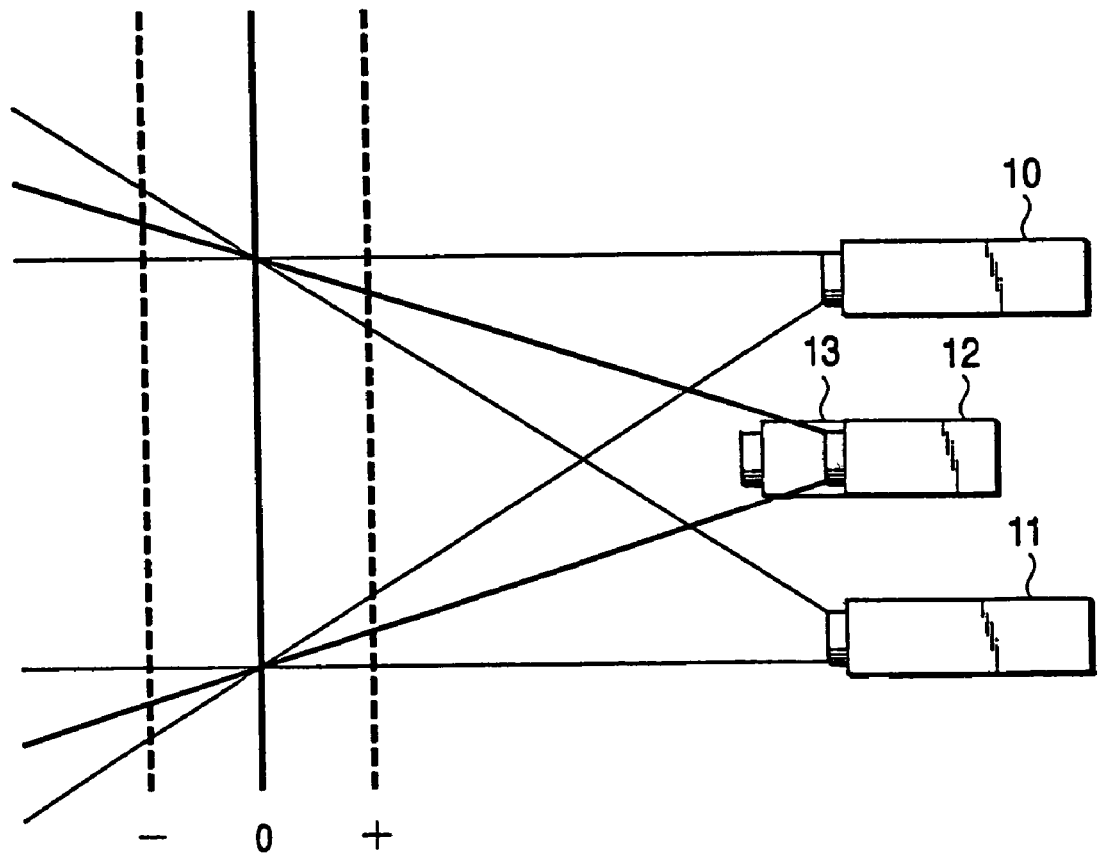
FIG. 4 is a side view of the range finder of the embodiment of the invention to describe projection and picking up of a pattern image.
Figure 5:
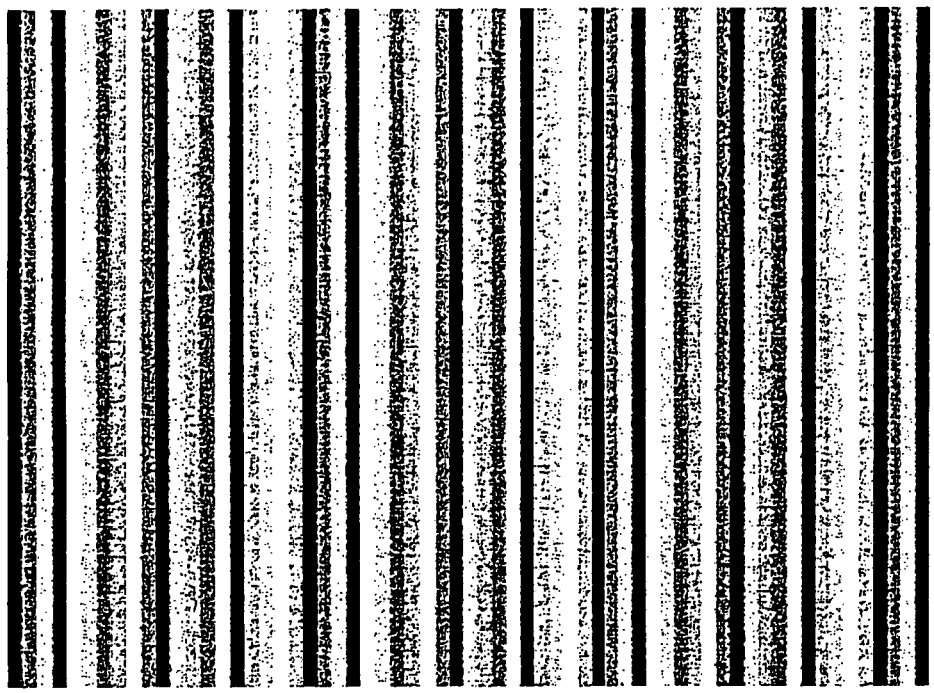
FIG. 5 is a drawing to describe an observation image of an image pickup apparatus (camera 1) when a screen is at position 0 in FIG. 4.
Figure 6:
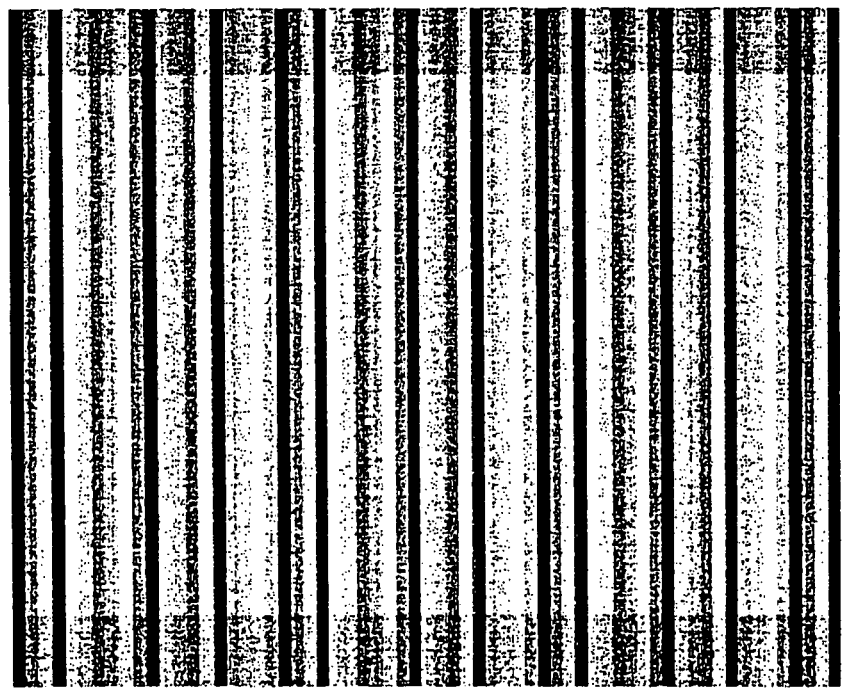
FIG. 6 is a drawing to describe an observation image of the image pickup apparatus (camera 1) when the screen is at position (+) in FIG. 4.
Figure 7:
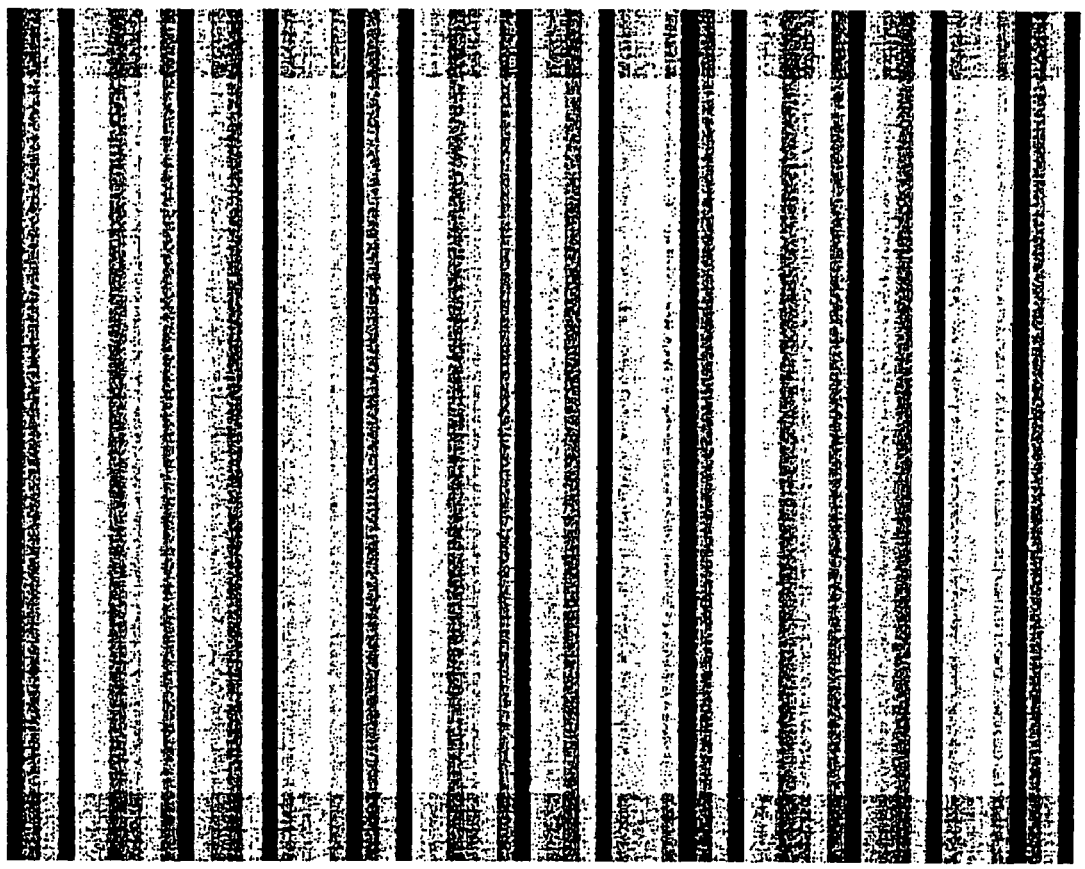
FIG. 7 is a drawing to describe an observation image of the image pickup apparatus (camera 1) when the screen is at position (−) in FIG. 4.

A specific description is given. FIG. 4 is a side view of the range finder. Placed up and down are the pattern projection apparatus 10 and 11 and placed therebetween is the image pickup apparatus (camera 1) 12. The pattern projection apparatus 10 and 11 are placed in a manner generally called a projector stack manner for the up and down projection apparatus to project the same patterns onto a screen (position of 0) with image free of distortion or shift. In order to superpose projection images by the pattern projection apparatuses 10 and 11, projection lens shift is used in each of the pattern projection apparatuses 10 and 11. As a stripe pattern, a pattern as shown in FIG. 5 is projected and the same stripe patterns are projected and superposed up and down. A case that the screen shifts back and forth is considered. If the screen shifts in the plus (+) direction, namely, shifts to the front, the images of the up and down projection apparatus do not match. As shown in FIG. 6, the portion where the optical paths of the up and down projectors overlap becomes a similar pattern to that in FIG. 5; however, in the portion where the optical paths of the up and down projectors do not overlap, the brightness is as much as that of one projection apparatus and thus an image as shown in FIG. 6 is projected at the position of (+). If the screen shifts in the minus (−) direction, namely, shifts to the back, similarly an image as shown in FIG. 7 is projected. Recoding is performed for the purpose of eliminating erroneous recognition caused by change in the stripe pattern based on object information (such as color of an object, density of an object, gloss of a surface of an object, and reflectivity of an object) and the like. Change in the density distribution in the stripe direction with the stripe shape maintained as in FIG. 6, 7 does not involve any problem as long as recoding is performed.

Figure 8:
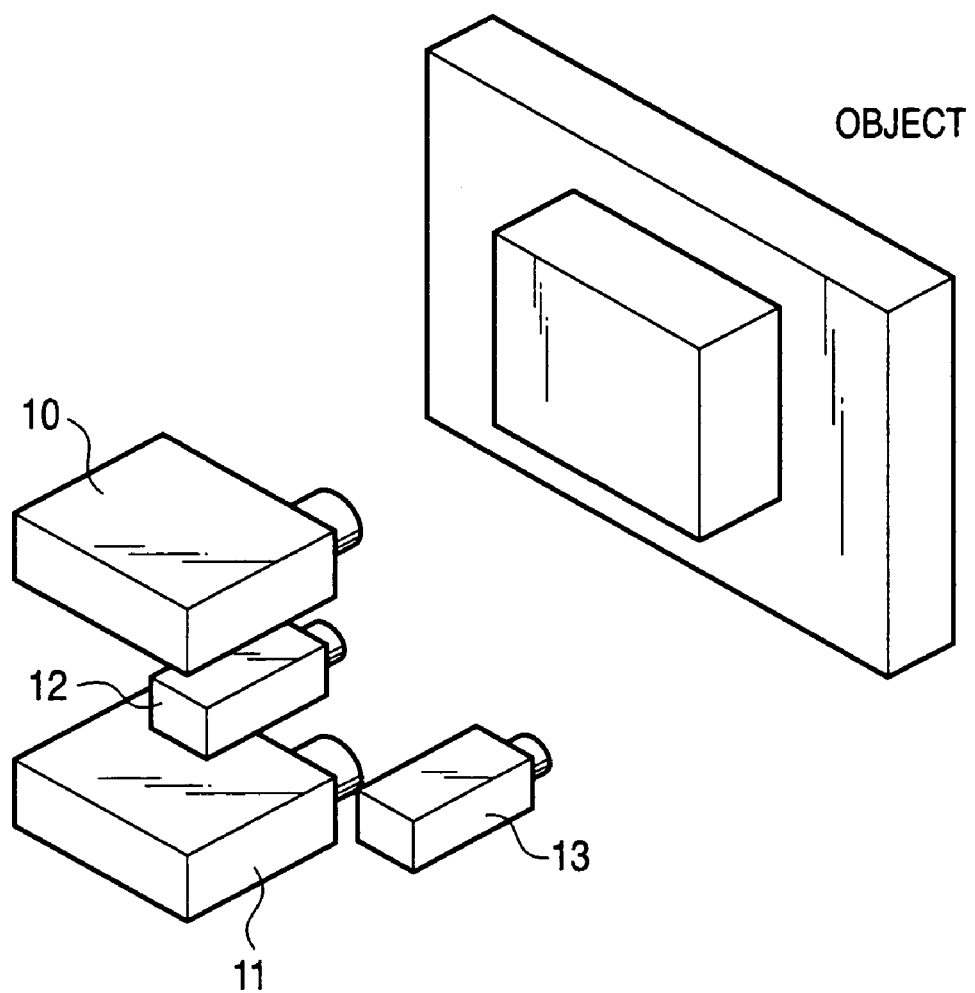
FIG. 8 is a drawing to describe the relationship between the range finder of the embodiment of the invention and subject (two flat plates)
Figure 9:
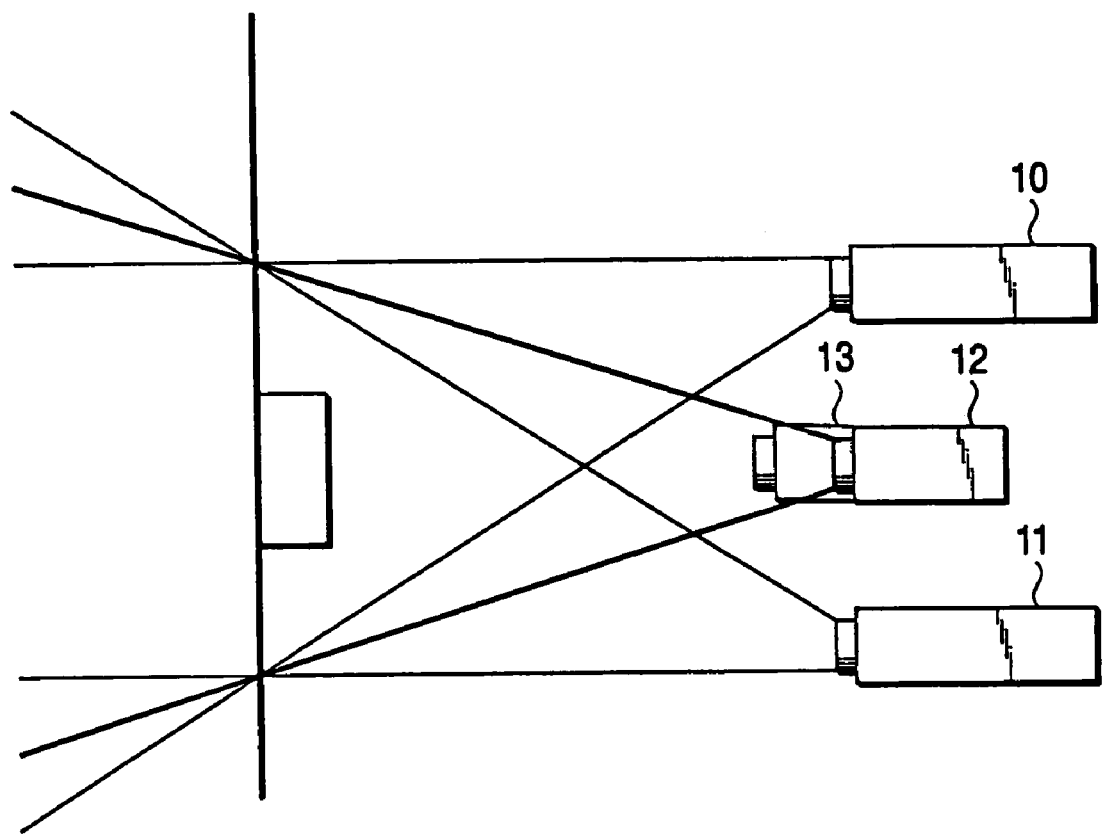
FIG. 9 is a side view of the apparatus and subject in FIG. 8.
Figure 10:
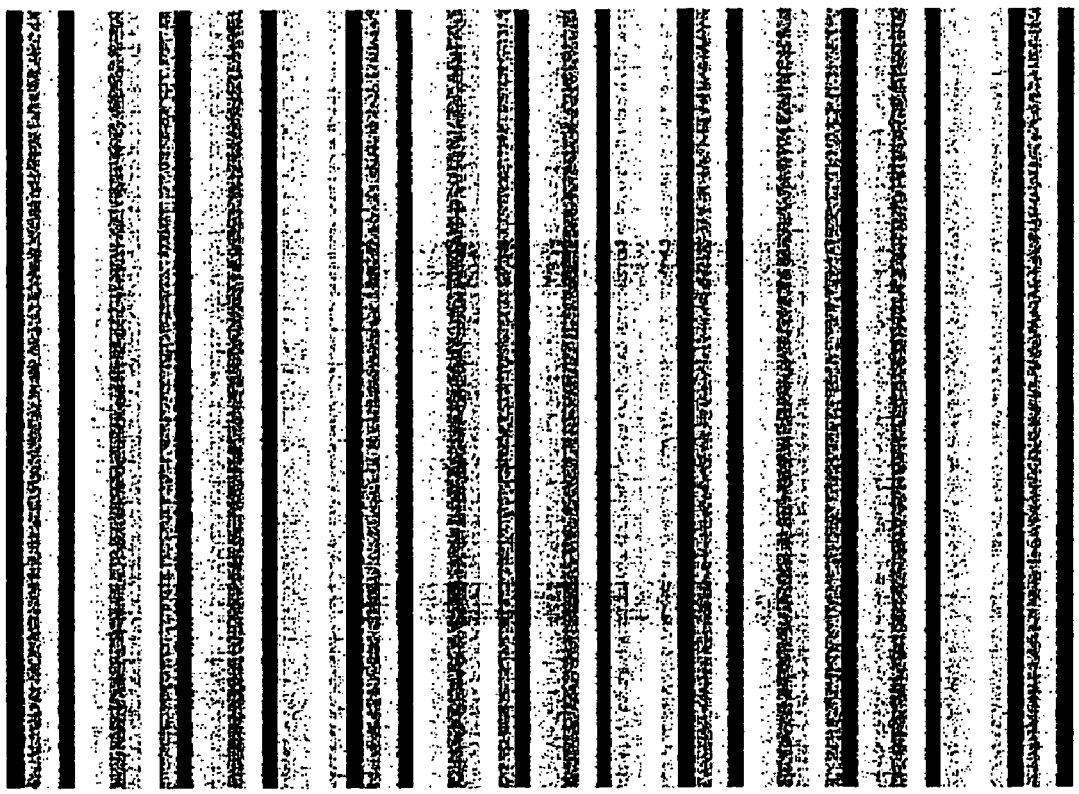
FIG. 10 is a drawing to describe an observation image of the image pickup apparatus (camera 1) in the example in FIG. 9.
Figure 11:
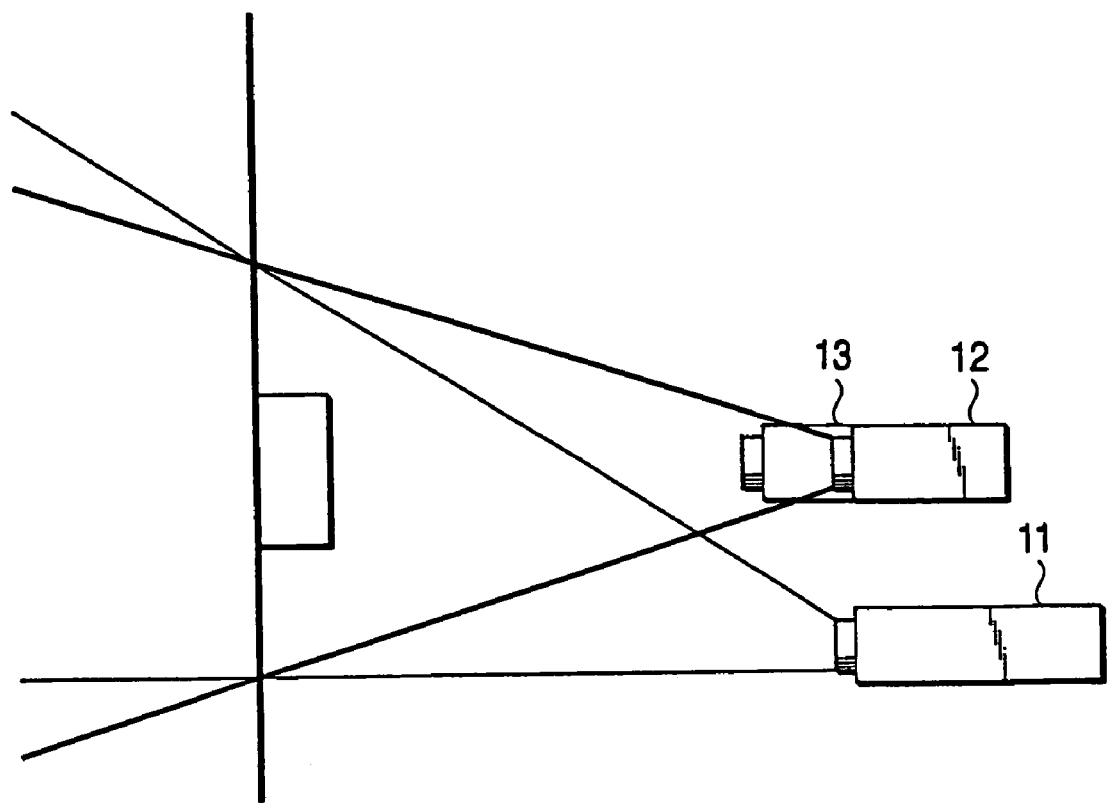
FIG. 11 is a side view when only pattern projection apparatus (projector 2) is installed in FIG. 8.
Figure 12:
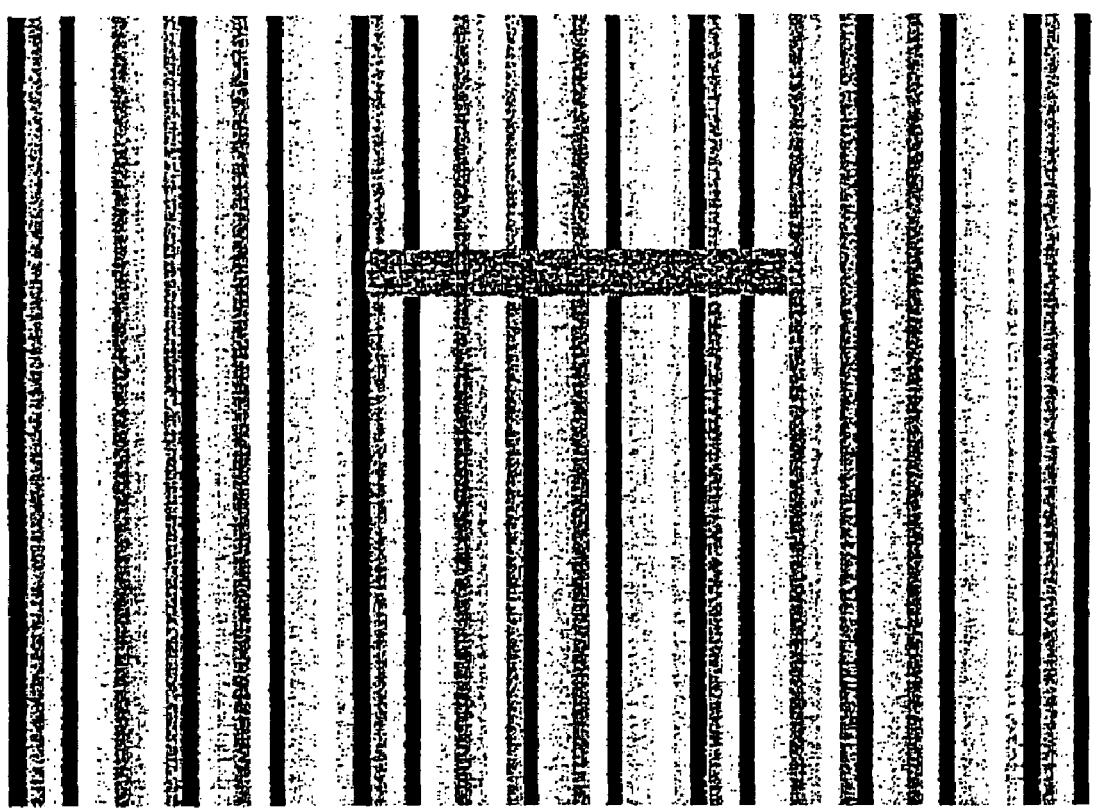
FIG. 12 is a drawing to describe an observation image of the image pickup apparatus (camera 1) in the example in FIG. 11.
Figure 13:
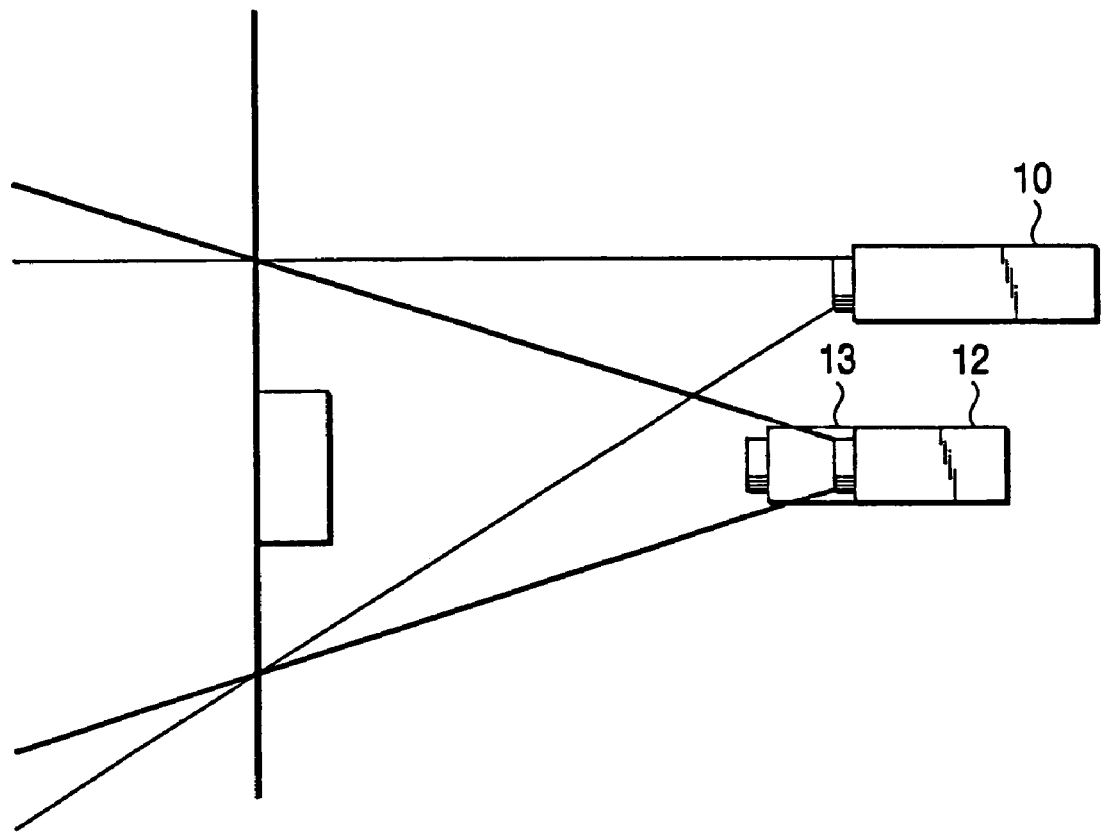
FIG. 13 is a side view when only pattern projection apparatus (projector 1) is installed in FIG. 8.
Figure 14:
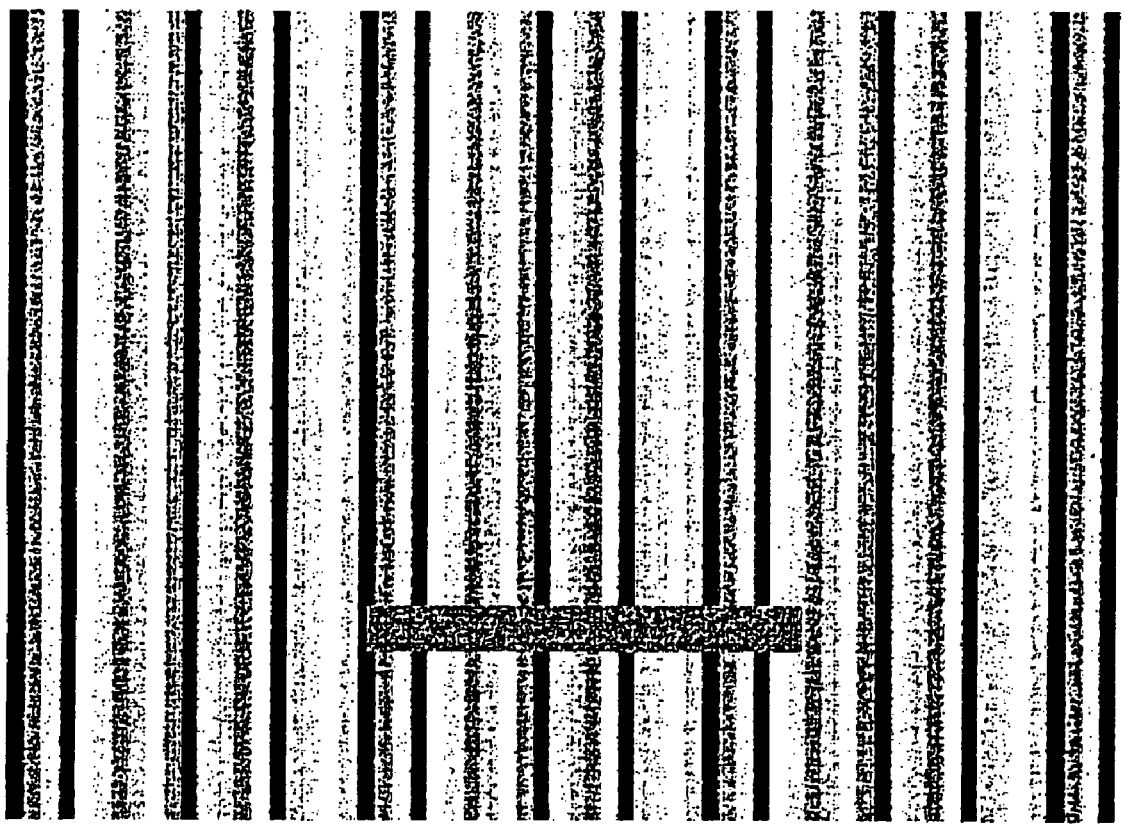
FIG. 14 is a drawing to describe an observation image of the image pickup apparatus (camera 1) in the example in FIG. 13.

A description is given based on a specific measured object. FIG. 8 is a schematic drawing to conduct measurement with two flat plates arranged in front of the range finder of the invention. FIG. 9 is a side view thereof. An image of the image pickup apparatus (camera 1) 12 observed according to the configuration is as shown in FIG. 10. That is, a projection pattern of only either of the projection apparatus is projected onto the shadow portion of the front flat plate. Assuming that only either of the projection apparatus 10 and 11 exists as shown in FIG. 11 or 13, the shadow of the front flat plate is reflected on the rear flat plate and an area where no stripe pattern exists occurs as shown in FIG. 12 or 14. As shown in FIG. 10, even if either of the projection apparatus cannot project a stripe pattern because of the shadow of the measured object, the image of the stripe pattern of either of the projection apparatus can be picked up in the image observed on the image pickup apparatus (camera 1) 12, and it is also made possible to execute recoding.

According to the described configuration, the image recoded in the image pickup apparatus (camera 1) 12 and checked on the image pickup apparatus (camera 2) 13 can be used to calculate a range image based the principle of triangulation.

In the example, two pattern projection apparatus are installed, but three or more pattern projection apparatus may be installed. Only one pattern projection apparatus may be placed. In this case, a portion where no pattern is formed occurs and it is made impossible to relate based on code as for the portion and it is made impossible to perform range calculation of the portion. In this case, processing of interpolating using the nearby range or the like may be performed. Alternatively, the object and the range finder may be moved relatively for making it possible to conduct measurement on an unmeasurable portion.

Figure 15:
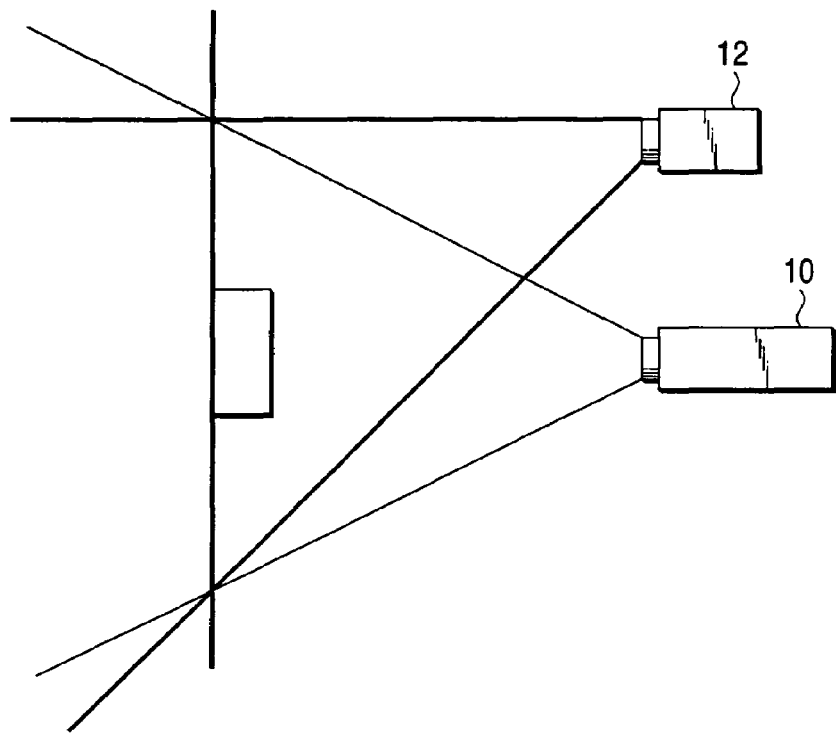
FIG. 15 is a side view to describe a modified example of the embodiment in which the camera is lens-shifted upward in the figure.
Figure 16:
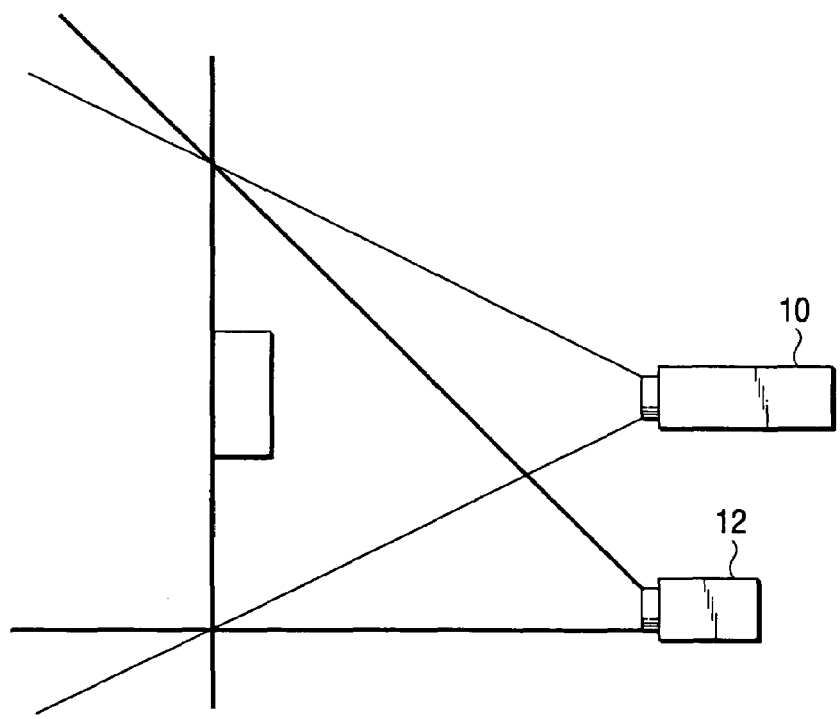
FIG. 16 is a side view to describe the modified example of the embodiment in which the camera is lens-shifted downward in the figure.

When one pattern projection apparatus (denoted by reference numeral 10) is installed, we can obtain the same effect as those shown in FIGS. 11 and 13 using lens shifts of the image pickup apparatuses 12 and 13 (cameras 1 and 2) without a projection lens shift of the pattern projection apparatus 10, as shown in FIGS. 15 and 16. Generally, the image pickup apparatuses 12 and 13 are smaller than the pattern projection apparatus 10 in the sizes of the apparatus and the lens and the weights of the apparatus and the lens. Therefore, it is expected that cost of an entire apparatus including cost of position adjustment with the lens shift and cost of a fixing jig are reduced.

Figure 32:
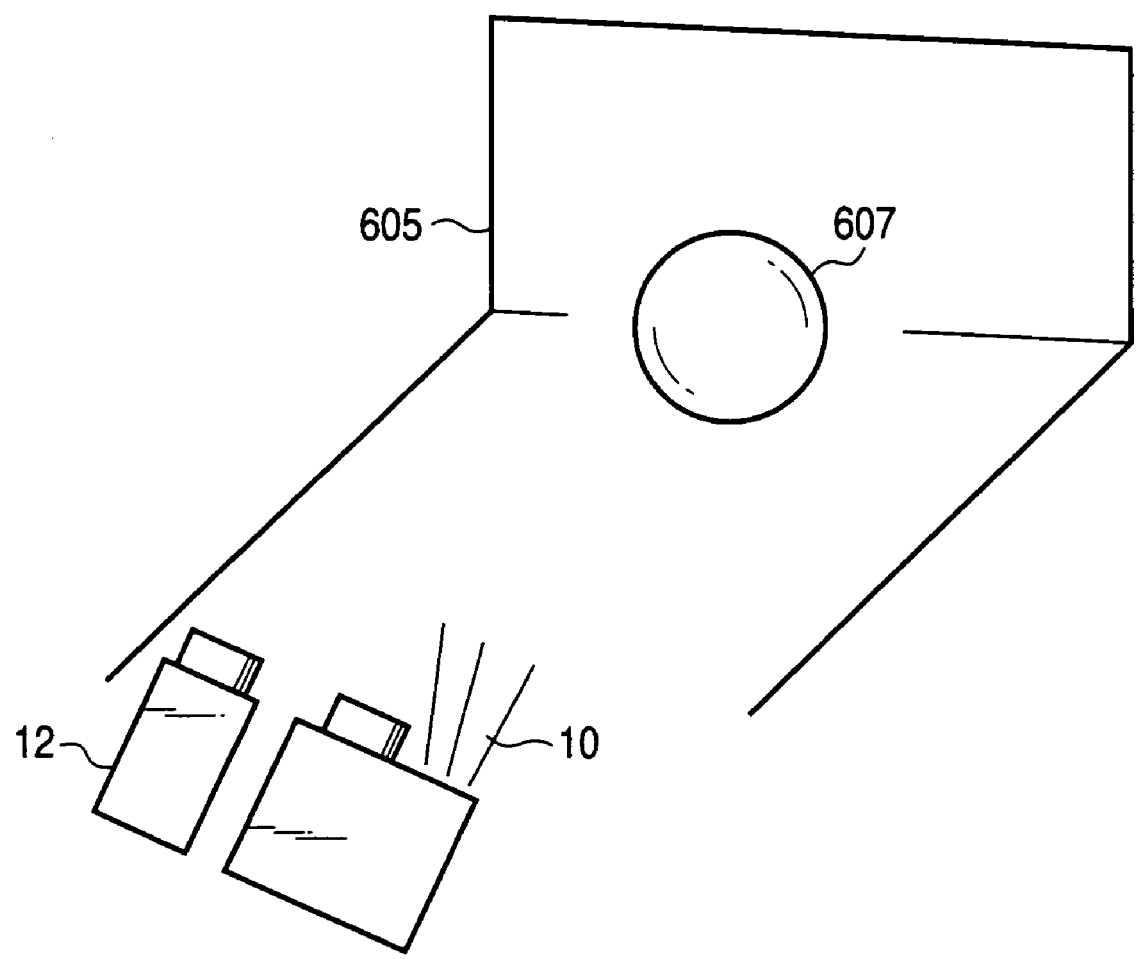
FIG. 32 is a drawing to describe the modified example of the embodiment in which the camera is lens-shifted.
Figure 33A:
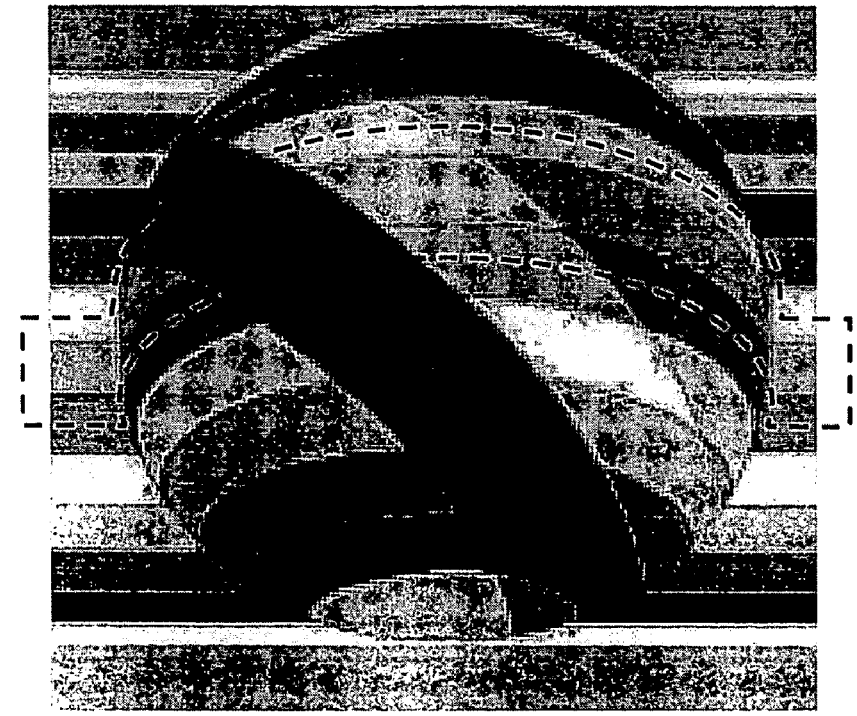
FIG. 33A is a drawing to shown an image picked up by the camera when the principle points of the camera and the pattern projector are not identical to each other.
Figure 33B:
FIG. 33B is a drawing to show an image pickup by the camera after the lens of the camera is shifted appropriately.
Figure 34C:
FIG. 34 is drawings to show parts of the stripe pattern picked up by the camera.
Figure 34B:
Figure 34A:

Here, a lens shift of the image pickup apparatus will be described in detail with reference to FIGS. 32 to 34. FIG. 32 shows a similar situation to FIG. 15. The pattern projection apparatus 10 projects a stripe pattern toward a wall 605. A ball 607 is disposed in front of the wall 605. The image pickup apparatus 12 picks up the projected stripe pattern formed on the wall 605 and/or the ball 607. When the principle point of the pattern projection apparatus 10 is not identical to that of the image pickup apparatus 12, the image pickup apparatus 12 picks up an image as shown in FIG. 33A. In the image of the FIG. 33A, an outline (an edge) of the stripe patterns formed on the wall 605 and ball 607 does not have a rectangle shape. Therefore, it is hard or impossible to the recording on the basis of this image. Accordingly, in the case of obtaining the same effect as those shown in FIGS. 11 and 13 with using the lens shift, it is necessary to shift the lens of the image pickup apparatus (at least the image pickup apparatus 12, that is, camera 1) so that the longitudinal direction of the stripe pattern 102 on an object (the ball 607) is substantially parallel to that of the stripe pattern 101 as shown in FIG. 33B. In other words, an outline (an edge) of the stripe pattern (FIG. 34C) formed on the wall 605 without the ball 607 and an outline (an edge) of the stripe pattern (FIG. 34B) formed on the wall 605 and the ball 607 are substantially identical to each other. It should be noted that since an outline (an edge) of the stripe pattern shown in FIG. 34B has a rectangle shape, this embodiment can perform the re-cording. Incidentally, FIGS. 34A and 34B show portions surrounded by dashed lines in FIGS. 33A and 33B, and FIG. 34C shows a part of the stripe pattern formed on the wall 605 without the ball 607. It should also be noted that the wall 605 is not essential for this embodiment. However, instead of lens-shifting the image pickup apparatus, the pattern projection apparatus may be lens-shifted so that the longitudinal directions of the stripes in the image picked up by the image pickup apparatus are substantially parallel to each other.

Figure 17:
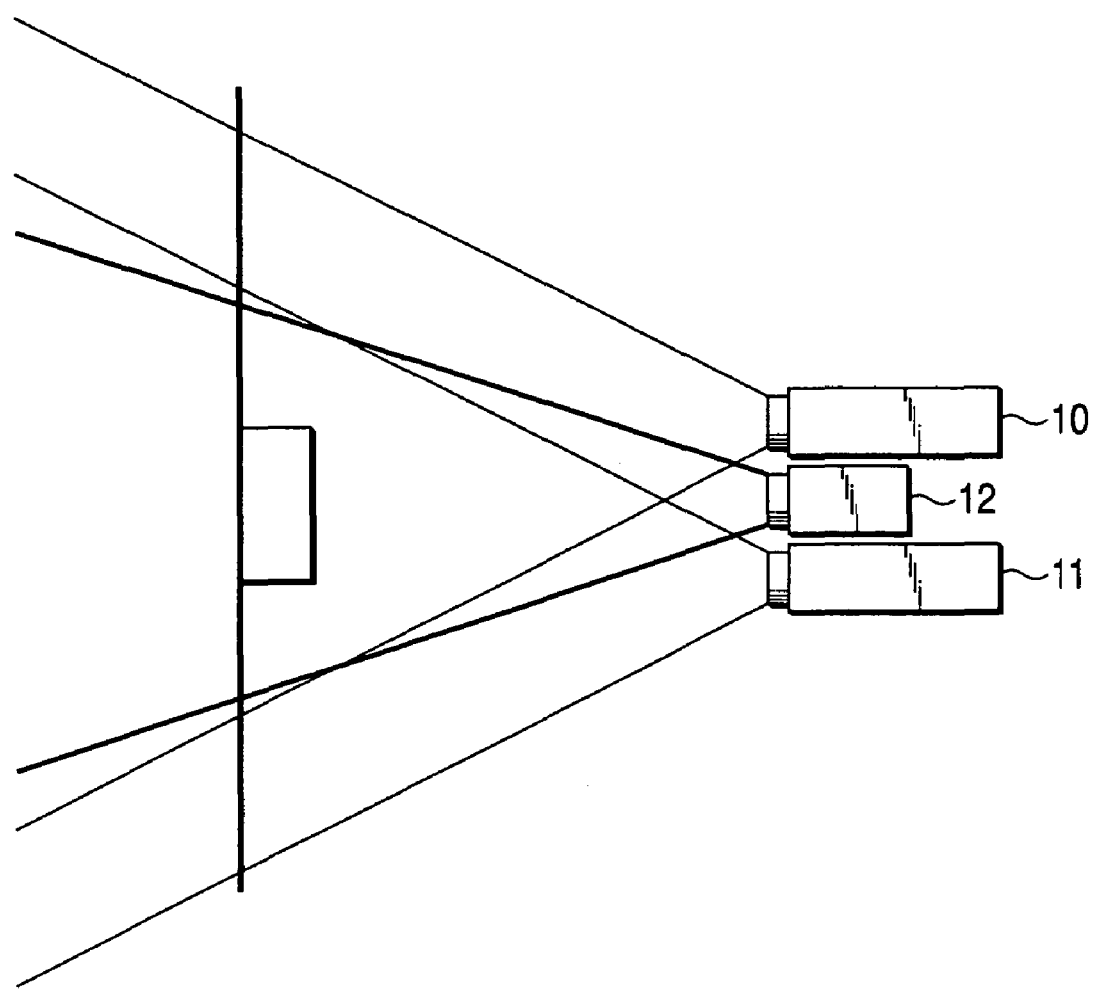
FIG. 17 is aside view to describe another modified example of the embodiment in which a camera and two projection apparatuses are arranged adjacently.
Figure 18:
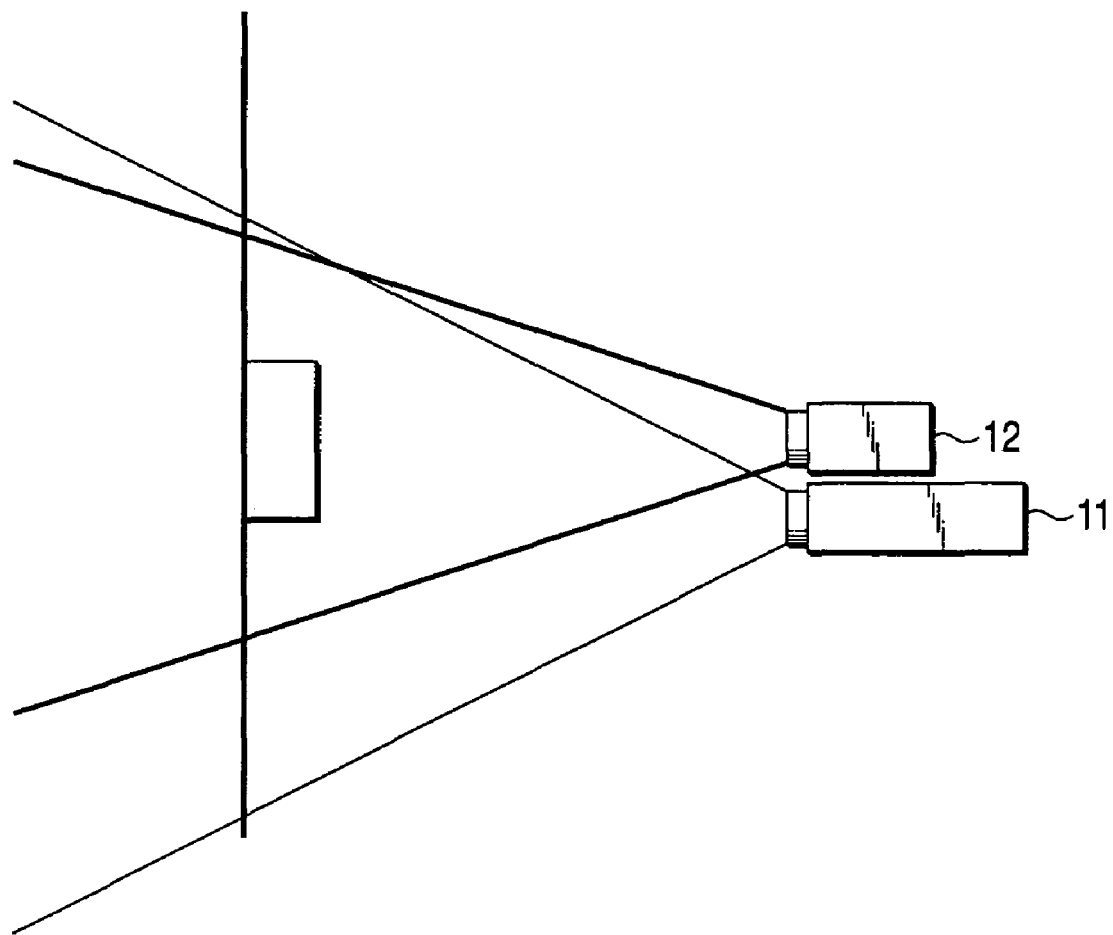
FIG. 18 is a side view to describe still another modified example of the embodiment in which the camera and the lower-arranged projection apparatus are arranged adjacently.
Figure 19:
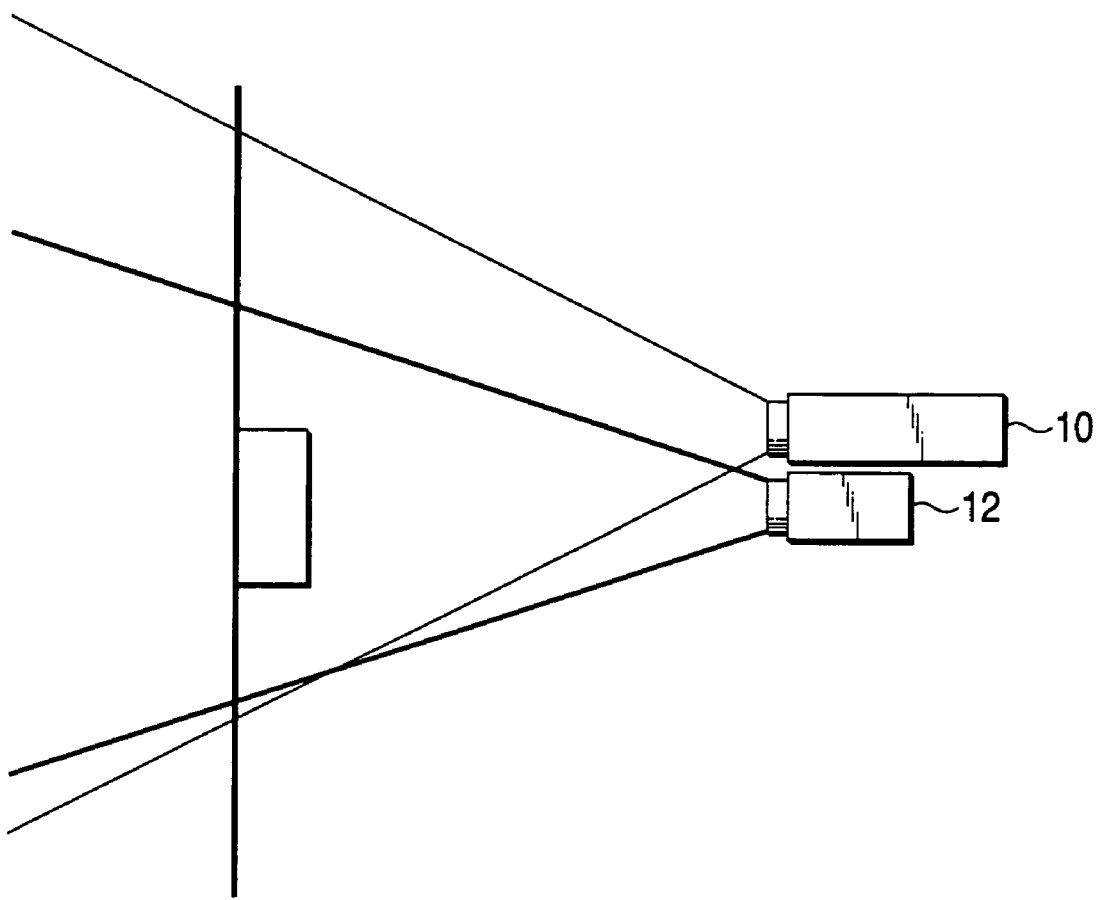
FIG. 19 is a side view to describe still another modified example of the embodiment in which the camera and the upper-arranged projection apparatus are arranged adjacently.
Figure 20:
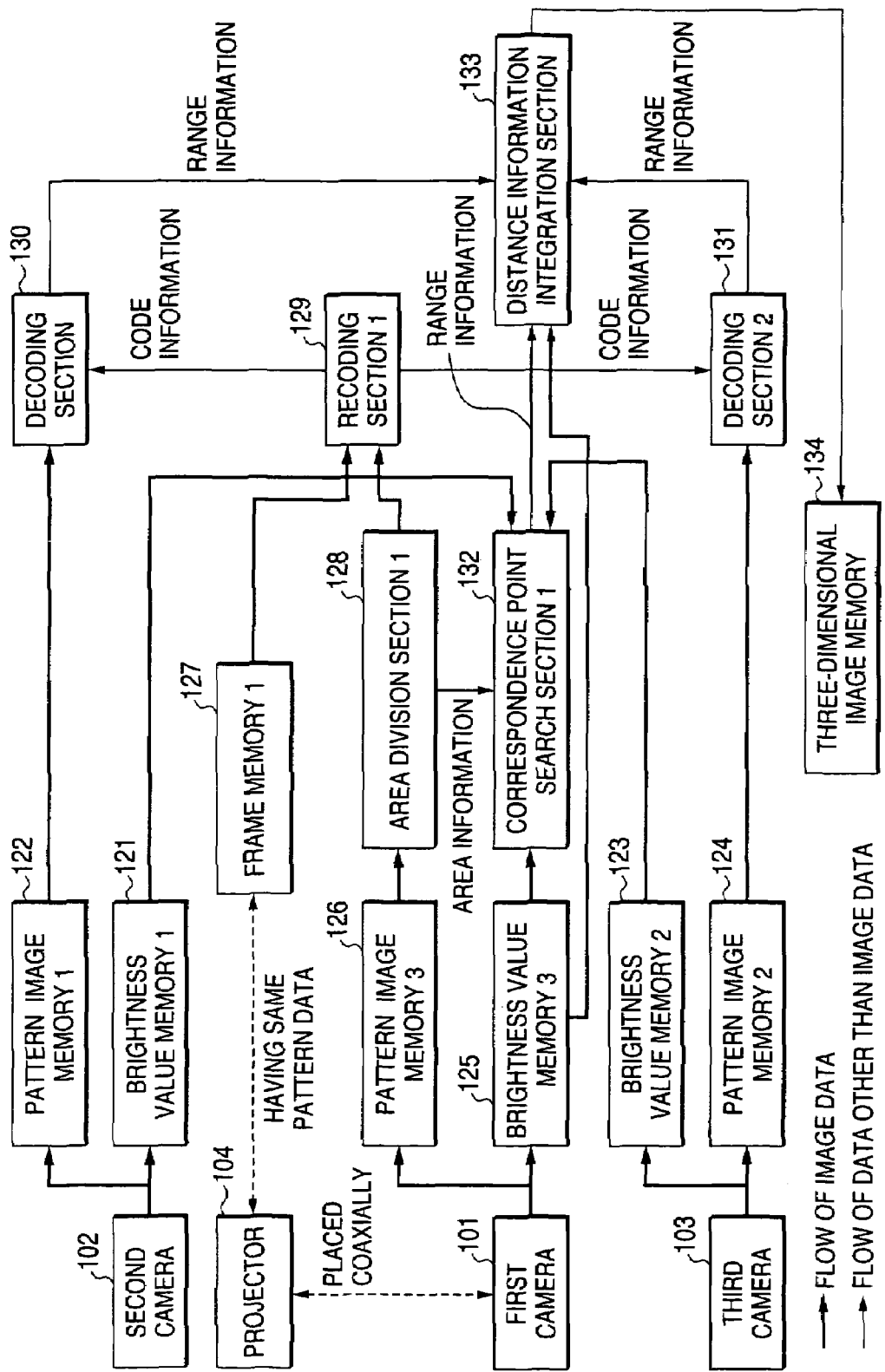
FIG. 20 is a block diagram to show a configuration example of a range finder in a related art.
Figure 21:
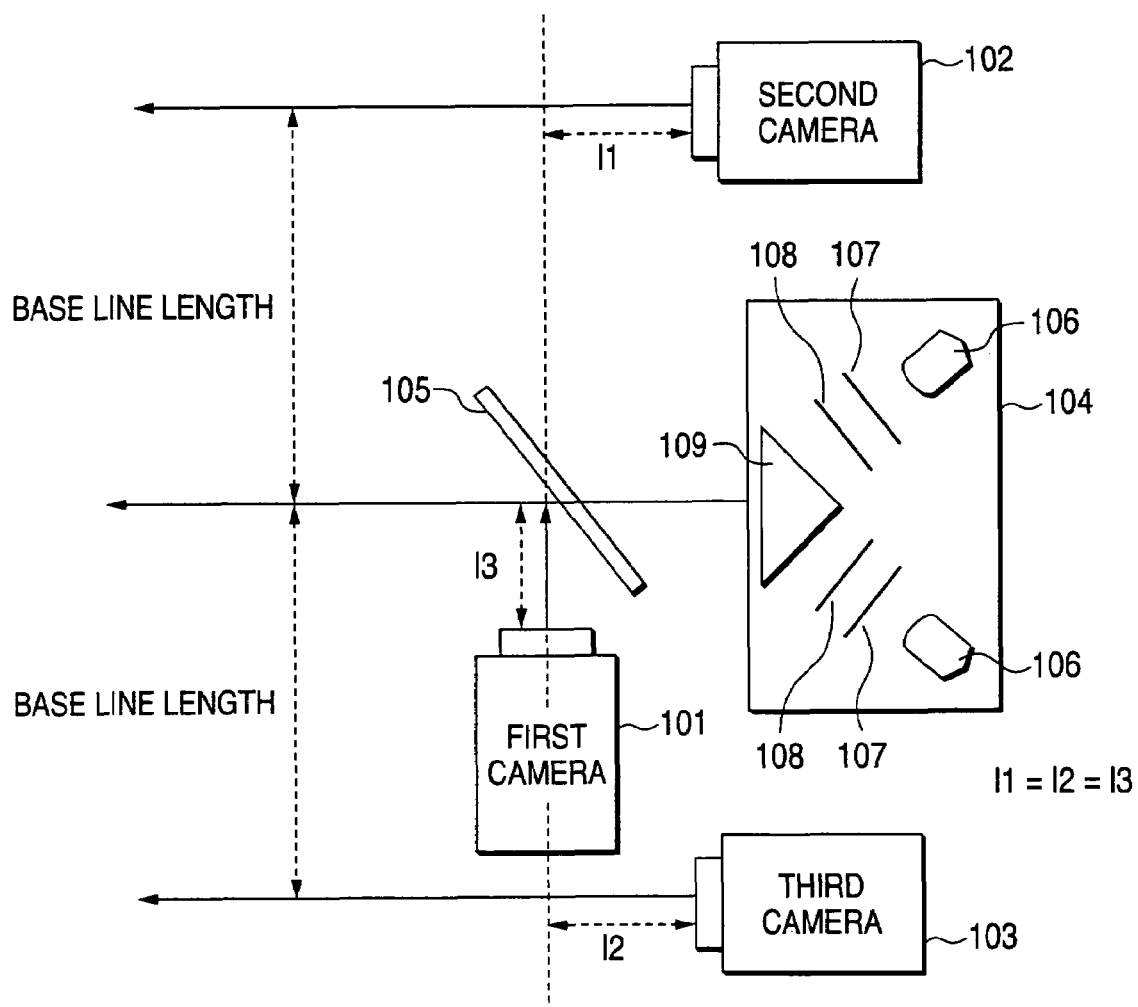
FIG. 21 is a drawing to show a camera configuration example of the range finder in the related art in FIG. 20.
Figure 22:
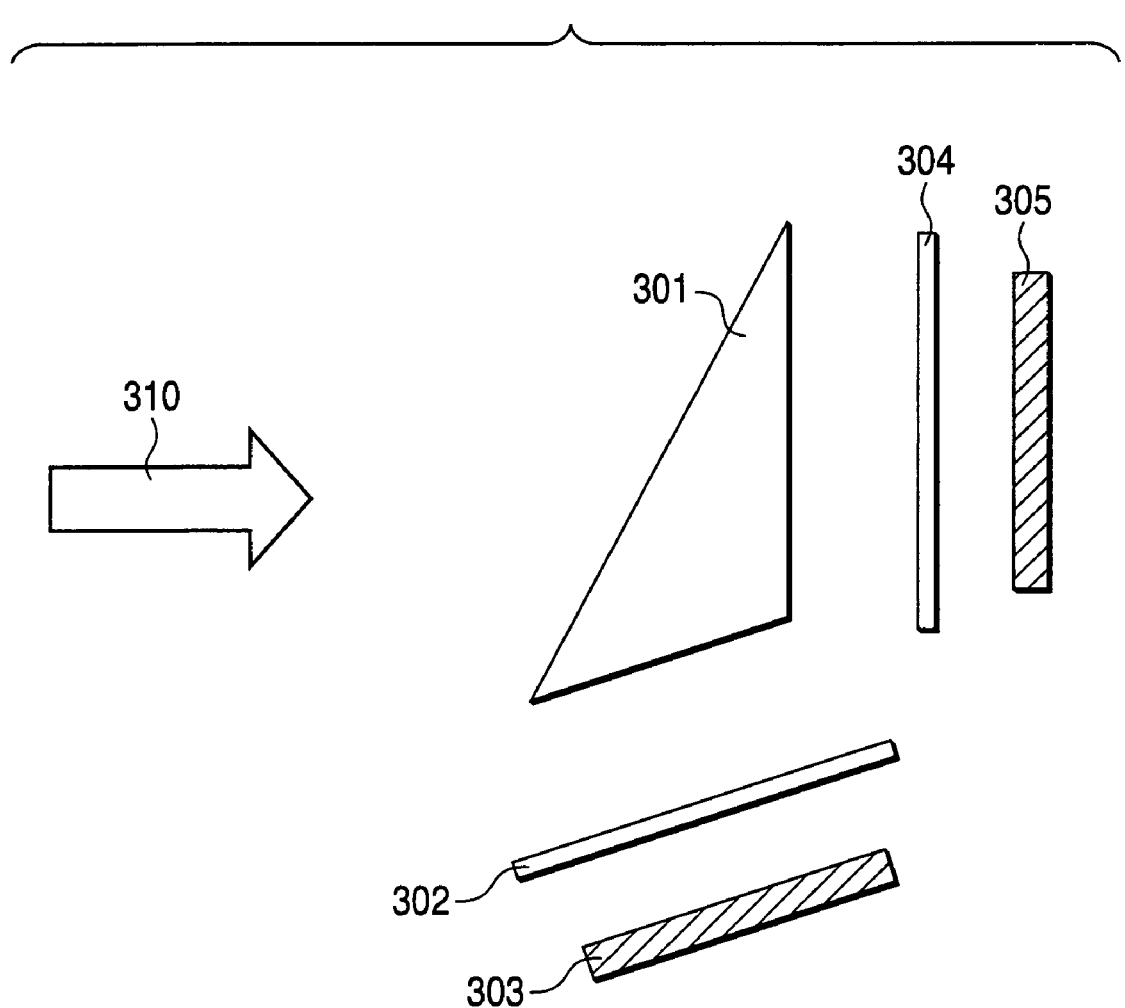
FIG. 22 is a drawing to describe the image pickup configuration of the range finder in the related art in FIG. 20.
Figure 25:
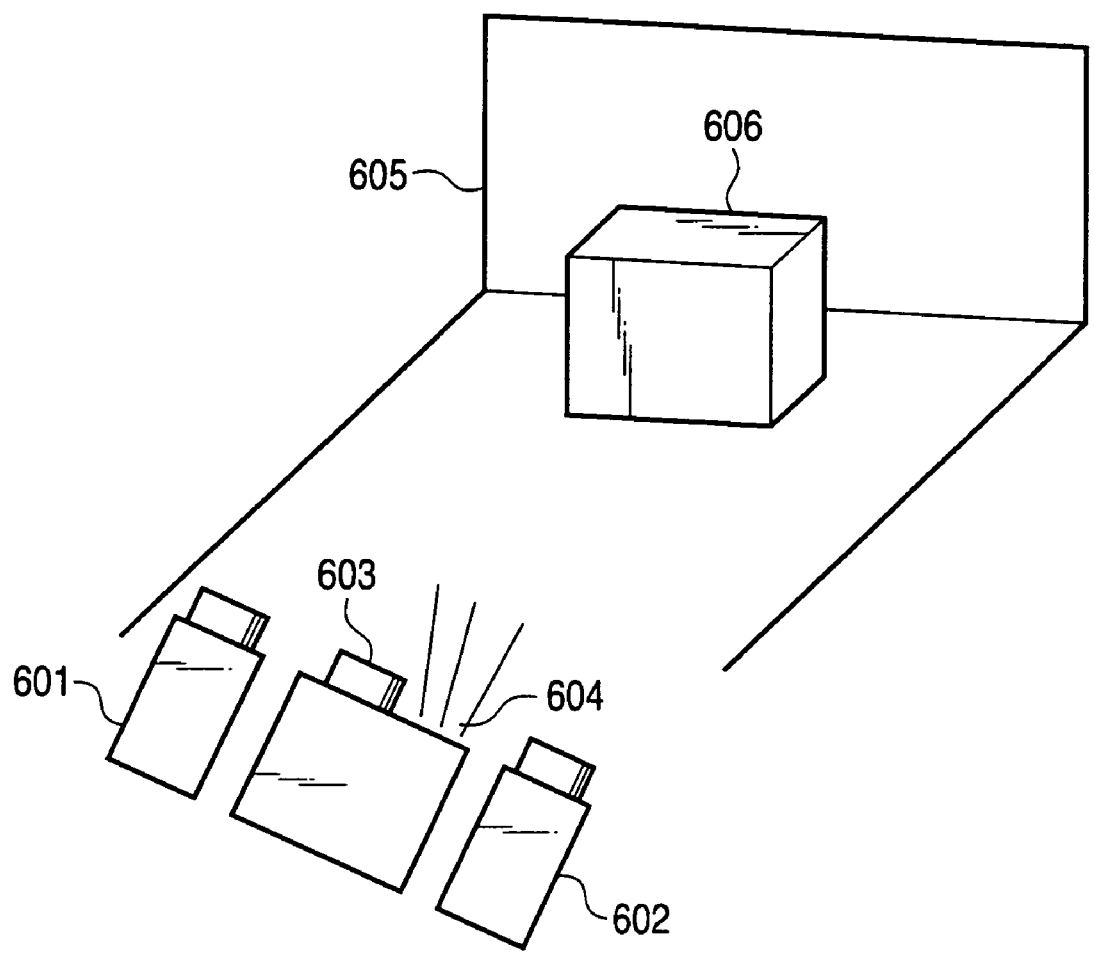
FIG. 25 is a drawing to describe the image pickup configuration of the range finder in the related art in FIG. 20.
Figure 26:
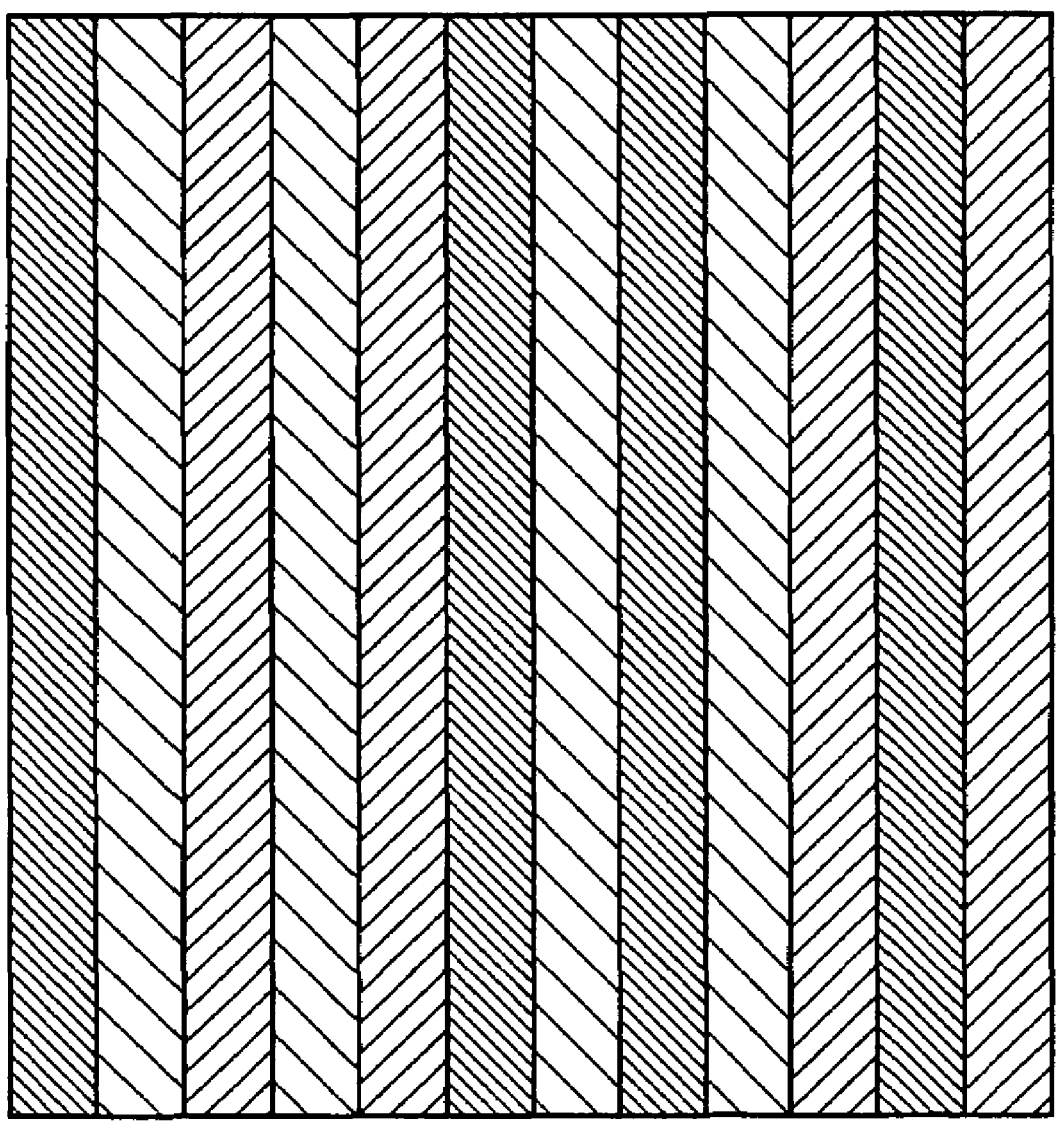
FIG. 26 is a drawing to show a projection pattern example of the range finder in the related art in FIG. 20.
Figure 27:
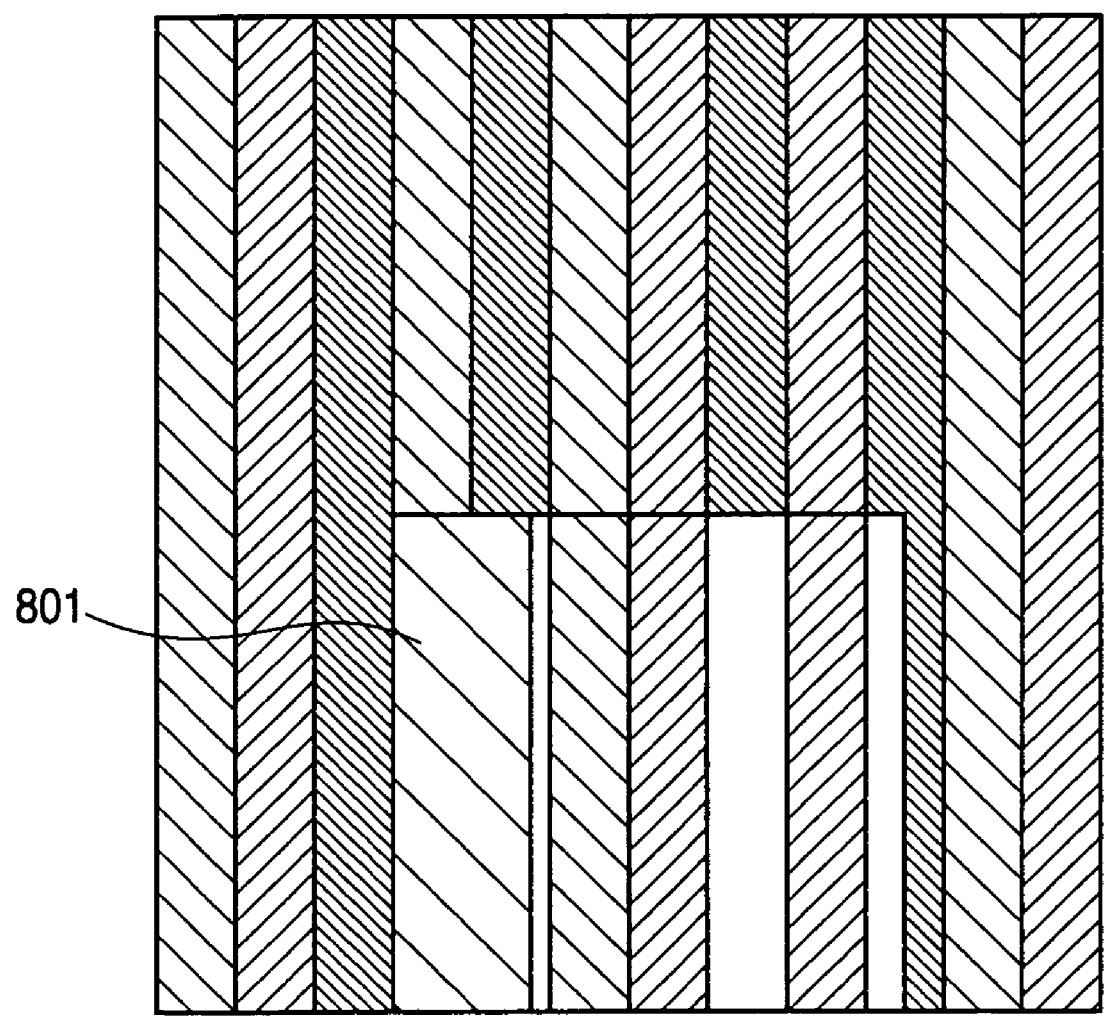
FIG. 27 is a drawing to show an example of a slit pattern photographed by a third camera 103 of the range finder in the related art in FIG. 20.
Figure 28:
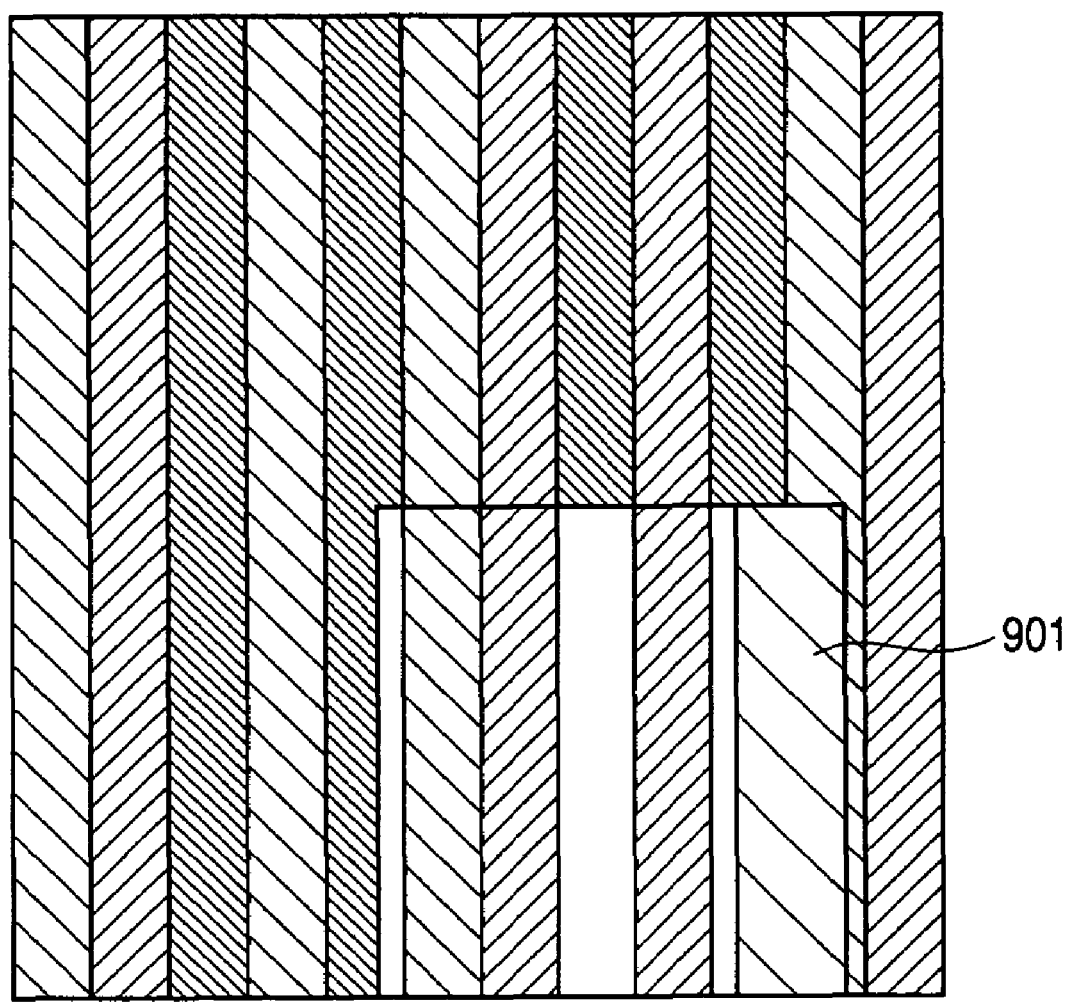
FIG. 28 is a drawing to show an example of a slit pattern photographed by a second camera 102 of the range finder in the related art in FIG. 20.
Figure 29:
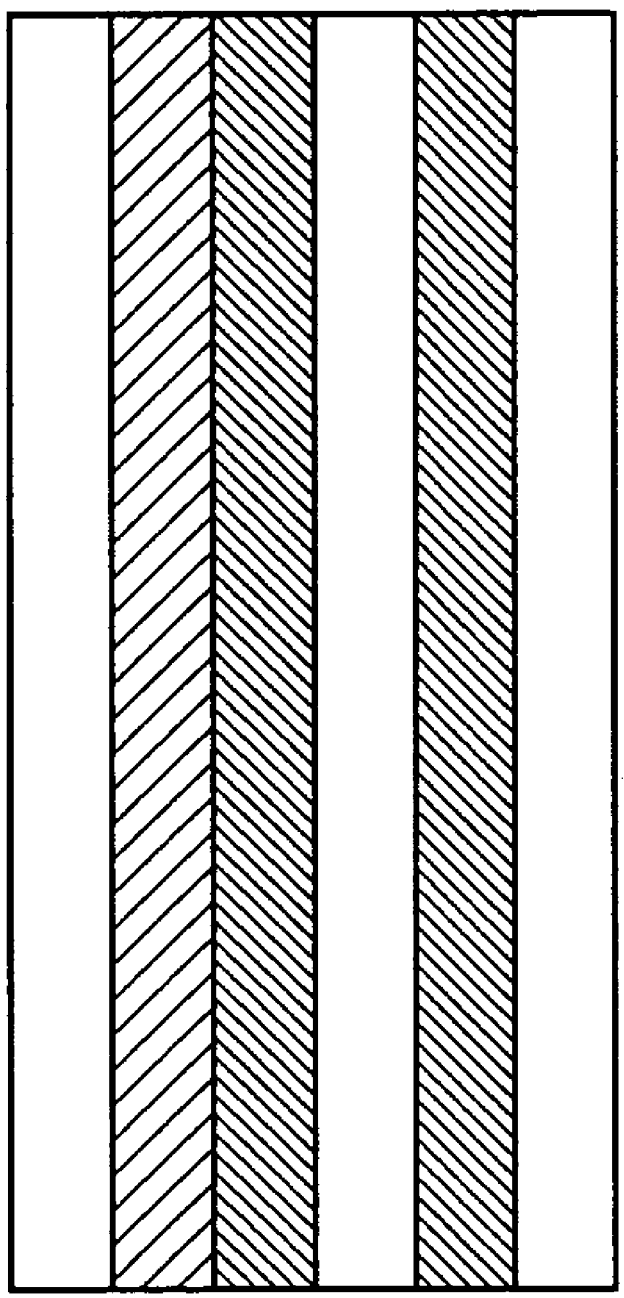
FIG. 29 is a drawing to show an example of a new coded slit pattern in the range finder in the related art in FIG. 20.
Figure 30:
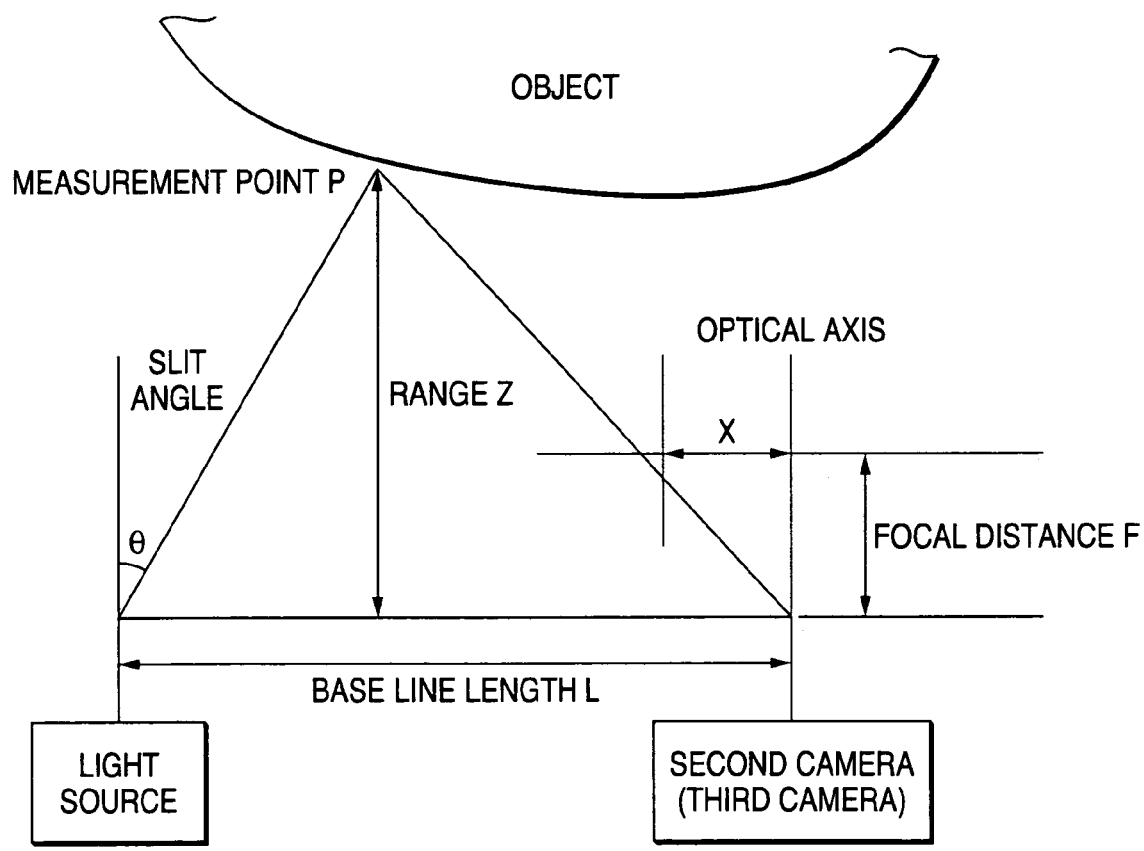
FIG. 30 is a drawing to show a range calculation method according to a space coding method of the range finder in the related art in FIG. 20.
Figure 31:
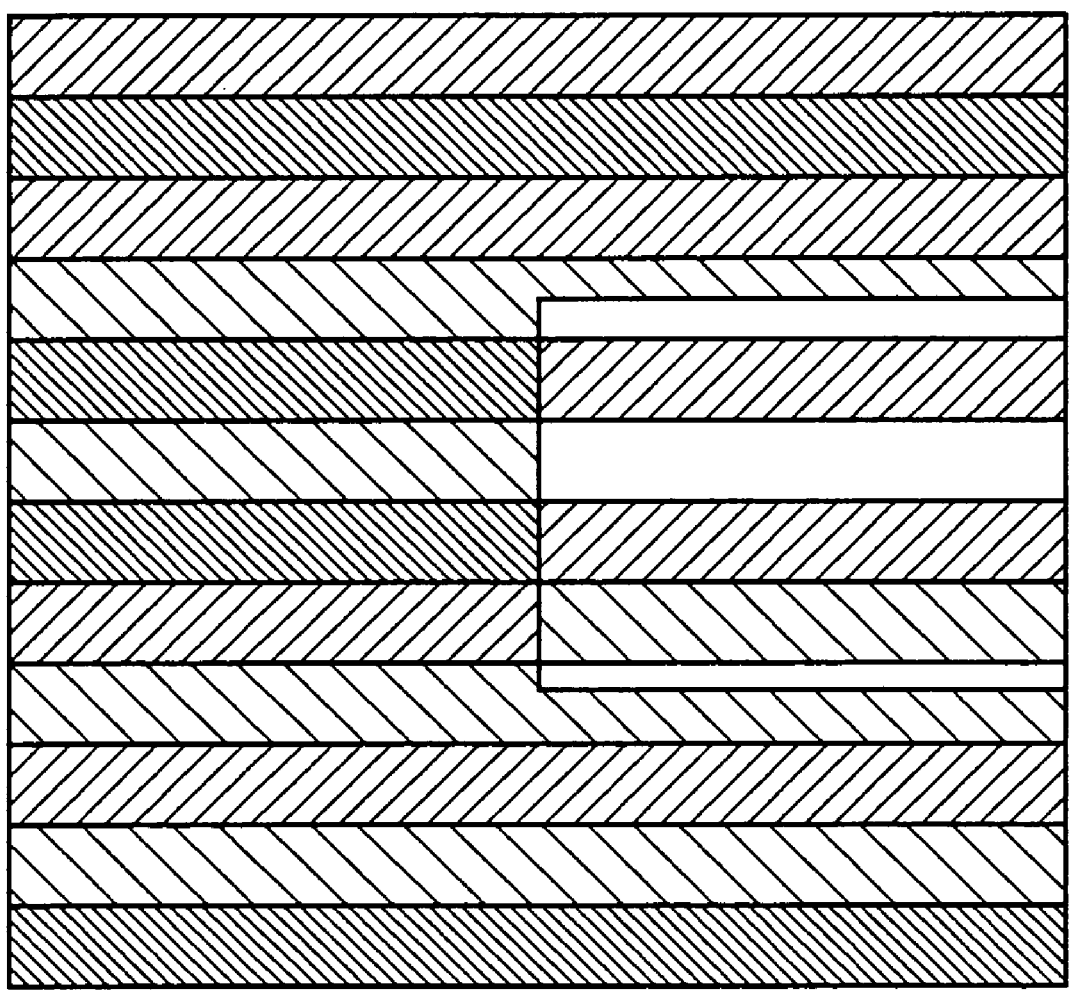
FIG. 31 is a drawing to show an example of a slit pattern photographed by a first camera 101 of the range finder in the related art in FIG. 20.

Furthermore, when two (or more) pattern projection apparatuses are installed or one image pickup apparatus is installed, we can obtain the same effect as those shown in FIGS. 9, 11, and 13 by bringing intervals between lenses to be small without using optical lens shifts of the projection apparatus 10 and the image pickup apparatus 12, as shown in FIGS. 17 to 19. For example, it is assumed that an interval between centers of lenses is 35 mm and projection/image pickup distances are 1,000 mm. In this case, since angle difference of only about two degrees occurs, we can consider that the pattern projection apparatus 10 and the image pickup apparatus 12 have the approximately same axis. Therefore, this structure can be constructed only by fixing an entire apparatus without using a shift function of each lens. This structure has the merit of reducing cost.

Shape measurement using the pattern projection apparatus 10 and shape measurement using the pattern projection apparatus 11 may be conducted separately and the measurement results may be made complementary to each other. That is, making adjustment so that the stripe patterns of the two up and down pattern projection apparatus 10 and 11 are completely superposed on each other as in the embodiment requires considerable accuracy and a considerable number of steps. In contrast, number of steps of adjustment of principal point matching between the pattern projection apparatus and the image pickup apparatus is small. Then, the pattern projection apparatus 10 and 11 project patterns separately, and shape measurement using the image pickup apparatus (camera 1) 12 and the image pickup apparatus (camera 2) 13 is conducted in each pattern projection. A shadow is produced in each of the pattern projection apparatus 10 and 11 and some shape measurement cannot be conducted. However, the shape portion produced in the pattern projection apparatus 10 differs from that produced in the pattern projection apparatus 11 and thus if both the shape measurement results are combined, the complete shape measurement result can be provided. Thus, if the user (operator) does not stick to one image pickup and shape measurement sequence, easy and complete shape measurement can be conducted.

This measurement will be described in more detail.

At first, principal points of the image pickup apparatus (camera 1) 12 and the pattern projection apparatuses 10, 11 are placed along a length direction of the stripe pattern with the pattern projection apparatuses 10, 11 sandwiching the image pickup apparatus (camera 1) 12 therebetween. The image pickup apparatuses (cameras 1, 2) 12, 13 are disposed so that the principal point of the image pickup apparatus (camera 1) 12 and a principal point of the image pickup apparatus (camera 2) 13 away from each other in a direction not parallel to the length direction of the stripe pattern. Under this state, shape measurement using the pattern projection apparatus 10 and shape measurement using the pattern projection apparatus 11 are conducted separately. That is, the pattern projection apparatus 10 and the pattern projection apparatus 11 are driven to project stripe patterns in different time periods. Then, an area is determined, with change amount of the stripe pattern, which is picked up by the image pickup apparatus (camera 1) 12, with respect to the stripe pattern projected by the pattern projection apparatus 10 being a predetermined value or more. A new code is assigned to the area. The image pickup apparatus (camera 2) 13 picks up a recoded stripe pattern projected by the pattern projection apparatus 10 after the new code is assigned. First range information of a three-dimensional object onto which the stripe pattern is projected is generated based on the recoded stripe pattern picked up by the image pickup apparatus (camera 2) 13. Then, the pattern projection apparatus 11 projects the stripe pattern to obtain second range information in a similar manner. That is, an area is determined, with change amount of the stripe pattern, which is picked up by the image pickup apparatus (camera 1) 12, with respect to the stripe pattern projected by the pattern projection apparatus 11 being a predetermined value or more. A new code is assigned to the area. The image pickup apparatus (camera 2) 13 picks up an image of a recoded stripe pattern projected by the pattern projection apparatus 11 after the new code is assigned. Then, the second range information of the three-dimensional object onto which the stripe pattern is projected is generated based on the image of the recoded stripe pattern picked up by the image pickup apparatus (camera 2) 13.

Finally, the first range information and the second range information are combined to form total range information.

It should be noted that in the above described embodiment, surface textures (brightness information; gray-scale or color) can be obtained together with the shape measurement (obtaining the range image) easily.

For example, texture information of a surface of a three-dimensional object on which a stripe pattern is projected can be obtained on the basis of images of stripe patterns obtained from the image pickup apparatus 12 (camera 1) and the image pickup apparatus 13 (camera 2).

Also, the texture information is obtained on the basis of an image picked up by the image pickup apparatus 12 (camera 1), the image pickup apparatus 13 (camera 2), or other image pickup apparatuses when the pattern projection apparatuses 10 and 11 don't project the stripe patterns.

Alternatively, three-dimensional image information and the texture information may be obtained simultaneously. That is, a camera 3 for texture pickup is used in order to obtain the surface texture information at the same time of obtaining the three-dimensional image information from the images of the stripe patterns, which are obtained by using the image pickup apparatus 12 (camera 1) and the image pickup apparatus 13 (camera 2). In addition, in order to obtain the surface texture information of the three-dimensional object onto which the stripe patterns are projected, the stripe patterns projected from the image pickup apparatuses include light in the infrared region or the ultraviolet region. The spectral sensitivities of the image pickup apparatus 12 (camera 1) and the image pickup apparatus 13 (camera 2) are configured to correspond to spectrum of the projected stripe patterns. The camera 3 for the texture pickup doesn't have the spectral sensitivity for the infrared stripe pattern and the ultraviolet stripe pattern, but has the spectral sensitivity only for the visible region. Thereby, the three-dimensional image information (the range image) can be obtained from infrared light or the like with the cameras 1 and 2. At the same time, the texture information also can be obtained from visible light with the camera 3.

As described above, according to the invention, the need for a half mirror or a beam splitter used with the measurement apparatus in the related art is eliminated and problems of brightness difference, alight scattering caused by dirt, dust, etc., and the like caused by a substance placed between a pattern projection apparatus and an image pickup apparatus do not occur on principle, so that more accurate measurement is made possible.

What is claimed is:

1. A range finder comprising:
a projector for projecting a coded stripe pattern;
a first camera for picking up an image of the stripe pattern projected by the projector, the first camera placed so that a principal point of the first camera and a principal point of the projector are placed along a length direction of the stripe pattern; and
a second camera for picking up an image of the stripe pattern projected by the projector, the second camera placed so that a principal point of the second camera and the principal point of the first camera are placed away from each other in a direction being not parallel to the length direction of the stripe pattern, wherein:
an area with change amount of the stripe pattern, which is picked up by the first camera, with respect to the stripe pattern projected by the projector being a predetermined value or more is determined;
a new code is assigned to the area;
the second camera picks up a recoded stripe pattern projected by the projector after the new code is assigned; and
range information of a three-dimensional object onto which the stripe pattern is projected is generated based on the recoded stripe pattern picked up by the second camera.

2. The range finder according to claim 1, wherein an optical system of the projector is lens-shifted so that stripes in the image picked up by the first camera are parallel to each other.

3. The range finder according to claim 1, wherein an optical system of the first camera is lens-shifted so that stripes in the image picked up by the first camera are parallel to each other.

4. The range finder according to claim 1, wherein a lens of the projector and a lens of the first camera are arranged to be adjacent to each other so that stripes in the image picked up by the first camera are parallel to each other.

5. The range finder according to claim 2, wherein:
the projector is at least one projector;
the principal point of all the projector and the principal point of the first camera are placed along the length direction of the stripe pattern; and
the coded stripe pattern projected from all the projector is matched with each other.

6. The range finder according to claim 4, wherein:
the projector is at least one projector;
the principal point of all the projector and the principal point of the first camera are placed along the length direction of the stripe pattern; and
all the projector and the first camera are arranged to be adjacent to each other.

7. The range finder according to claim 2, wherein:
total number of the projectors is two; and
the two projectors are placed so as to sandwich the first camera therebetween.

8. The range finder according to claim 1, wherein texture information of a surface of the three-dimensional object onto which the stripe pattern is projected is generated from the images of the stripe pattern picked up by the first camera and the second camera.

9. The range finder according to claim 1, wherein texture information of a surface of the three-dimensional object onto which the stripe pattern is projected is obtained from an image picked up by the first camera when the projector does not project the stripe pattern.

10. The range finder according to claim 1, wherein texture information of a surface of the three-dimensional object onto which the stripe pattern is projected is obtained from an image picked up by the second camera when the projector does not project the stripe pattern.

11. The range finder according to claim 1, further comprising a third camera, wherein texture information of a surface of the three-dimensional object onto which the stripe pattern is projected is obtained from an image picked up by the third camera when the projector does not project the stripe pattern.

12. The range finder according to claim 1, further comprising a third camera for texture pickup, wherein:
   the third camera is used to obtain texture information of a surface of the three-dimensional object onto which the stripe pattern is projected at the same time of obtaining the range information;
   the stripe pattern, which is projected from the projector to obtain the texture information, includes at least one of infrared light and ultraviolet light;
   the first and second cameras are configured to have spectral sensitivities corresponding to spectrum of the projected stripe pattern, respectively; and
   the third camera has spectral sensitivity only for the visible region.

13. A range finder comprising:
   a projector for projecting a coded stripe pattern;
   a first camera for picking up an image of the stripe pattern projected by the projector, the first camera placed so that a principal point of the first camera and a principal point of the projector are placed along a length direction of the stripe pattern; and
   a second camera for picking up an image of the stripe pattern projected by the projector, the second camera placed so that a principal point of the second camera and the principal point of the first camera are placed away from each other in a direction being not parallel to the length direction of the stripe pattern, wherein:
   range information of a three-dimensional object onto which the stripe pattern is projected is generated on the basis of an pickup image of the stripe pattern picked up by the first camera and a pickup image of the stripe pattern picked up by the second camera.

14. A three-dimensional image pickup method comprising:
   providing a projector for projecting a coded stripe pattern, a first camera and a second camera each for picking up the stripe pattern projected by the projector;
   determining an area with change amount of the stripe pattern, which is picked up by the first camera, with respect to the stripe pattern projected by the projector being a predetermined value or more;
   assigning a new code to the area;
   picking up a recoded stripe pattern projected by the projector after the new code is assigned by the second camera; and
   generating range information of a three-dimensional object onto which the stripe pattern is projected based on the image of the recoded stripe pattern picked up by the second camera, wherein:
   a principal point of the first camera and a principal point of the projector are placed along a length direction of the stripe pattern; and
   the principal point of the first camera and a principal point of the second camera are placed away from each other in a direction not parallel to the length direction of the stripe pattern.

15. A three-dimensional image pickup method comprising:
   providing a first projector and a second projector each for projecting a coded stripe pattern, and a first camera and a second camera for picking up images of the stripe patterns projected by the first projector and the second projector;
   placing a principal point of the first camera and principal points of the first projector and the second projector along a length direction of the stripe pattern;
   placing the first and second projectors to sandwich the first camera therebetween;
   placing the principal point of the first camera and a principal point of the second camera away from each other in a direction not parallel to the length direction of the stripe pattern;
   driving the first projector and the second projector to project stripe patterns in different time periods;
   determining a first area with change amount of the stripe pattern, which is picked up by the first camera, with respect to the stripe pattern projected by the first projector being a predetermined value or more;
   assigning a first new code to the first area;
   picking up a recoded stripe pattern projected by the first projector after the new code is assigned by the second camera;
   generating first range information of a three-dimensional object onto which the stripe pattern is projected based on the recoded stripe pattern picked up by the second camera;
   determining a second area with change amount of the stripe pattern, which is picked up by the first camera, with respect to the stripe pattern projected by the second projector being a predetermined value or more;
   assigning a second new code to the second area;
   picking up an image of are coded stripe pattern projected by the second projector after the new code is assigned by the second camera;
   generating second range information of the three-dimensional object onto which the stripe pattern is projected based on the image of the recoded stripe pattern picked up by the second camera; and
   combining the first range information and the second range information to form total range information.

* * * * *